US012199383B2

(12) United States Patent
Little et al.

(10) Patent No.: US 12,199,383 B2
(45) Date of Patent: Jan. 14, 2025

(54) DIFFERENTIAL SIGNAL ELECTRICAL CONNECTOR WITH GROUNDING CONTACTS EXTENDING FROM SHIELDING PLATES

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Terrance F. Little, Fullerton, CA (US); Patrick R. Casher, North Aurora, IL (US); Chih-Hsien Chou, San Jose, CA (US); An-Jen Yang, Irvine, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 510 days.

(21) Appl. No.: 17/498,714

(22) Filed: Oct. 11, 2021

(65) Prior Publication Data

US 2022/0115818 A1 Apr. 14, 2022

Related U.S. Application Data

(60) Provisional application No. 63/090,225, filed on Oct. 10, 2020.

(51) Int. Cl.
*H01R 13/6585* (2011.01)
*H01R 13/502* (2006.01)
(Continued)

(52) U.S. Cl.
CPC ....... *H01R 13/6585* (2013.01); *H01R 13/502* (2013.01); *H01R 13/514* (2013.01);
(Continued)

(58) Field of Classification Search
CPC H01R 13/6585; H01R 13/502; H01R 13/514; H01R 13/6586; H01R 13/6587;
(Continued)

(56) References Cited

U.S. PATENT DOCUMENTS 8,540,525 B2 9/2013 Regnier et al.
9,692,183 B2 * 6/2017 Phillips .............. H01R 13/6471
(Continued)

FOREIGN PATENT DOCUMENTS

CN 204760581 11/2015

*Primary Examiner* — Justin M Kratt
(74) *Attorney, Agent, or Firm* — Ming Chieh Chang

(57) ABSTRACT

An electrical connector assembly includes an upper connector unit and a lower connector unit in a vertical direction. Each connector unit includes a contact module received within an insulative housing. The contact module includes an upper contact unit and a lower contacts unit stacked with each other. Each of the upper contact unit and the lower contact unit includes a front/outer contact part and a rear/inner contact part each including a plurality contacts essentially composed of a plurality of differential-pair signal contacts and a plurality of grounding contacts alternately arranged with each other in a the transverse direction wherein the differential-pair signal contacts are stamped and formed from sheet metal and successively integrally formed with a plurality of insulative transverse bars via insert-molding while the grounding contacts are directly blanked from sheet metal and associated with corresponding shielding plates assembled to the insulative transverse bar.

15 Claims, 25 Drawing Sheets

(51) Int. Cl.

| | |
|---|---|
| ***H01R 13/514*** | (2006.01) |
| ***H01R 13/6586*** | (2011.01) |
| ***H01R 13/6587*** | (2011.01) |
| ***H01R 13/6594*** | (2011.01) |
| ***H01R 25/00*** | (2006.01) |
| *H01R 12/57* | (2011.01) |
| *H01R 12/72* | (2011.01) |
| *H01R 13/40* | (2006.01) |
| *H01R 13/405* | (2006.01) |
| *H01R 13/504* | (2006.01) |
| *H01R 13/6461* | (2011.01) |
| *H01R 13/6471* | (2011.01) |
| *H01R 13/648* | (2006.01) |
| *H01R 13/658* | (2011.01) |
| *H01R 13/6581* | (2011.01) |

(52) U.S. Cl.

CPC ..... *H01R 13/6586* (2013.01); *H01R 13/6587* (2013.01); *H01R 13/6594* (2013.01); *H01R 25/00* (2013.01); *H01R 12/57* (2013.01); *H01R 12/721* (2013.01); *H01R 13/40* (2013.01); *H01R 13/405* (2013.01); *H01R 13/504* (2013.01); *H01R 13/6461* (2013.01); *H01R 13/6471* (2013.01); *H01R 13/648* (2013.01); *H01R 13/658* (2013.01); *H01R 13/6581* (2013.01)

(58) Field of Classification Search

CPC .... H01R 13/6594; H01R 25/00; H01R 12/57; H01R 12/721; H01R 13/40; H01R 13/405; H01R 13/504; H01R 13/6461; H01R 13/6471; H01R 13/648; H01R 13/658; H01R 13/6581

See application file for complete search history.

(56) References Cited

U.S. PATENT DOCUMENTS

| | | | | |
|---|---|---|---|---|
| 10,164,380 | B2 | 12/2018 | Regnier | |
| 10,367,308 | B2 | 7/2019 | Little et al. | |
| 10,396,513 | B2 | 8/2019 | Regnier | |
| 10,461,475 | B2 | 10/2019 | Little | |
| 10,630,010 | B2 | 4/2020 | Tracy et al. | |
| 2019/0020152 | A1* | 1/2019 | Little ................. | H01R 13/6587 |

* cited by examiner

DIFFERENTIAL SIGNAL ELECTRICAL CONNECTOR WITH GROUNDING CONTACTS EXTENDING FROM SHIELDING PLATES

CROSS REFERENCE TO RELATED APPLICATION

This application claims priority to U.S. Application No. 63/090,225, filed Oct. 10, 2020, the content of which is incorporated herein by reference in its entirety.

BACKGROUND OF THE INVENTION

1. Field of the Invention

The present invention relates generally to an electrical device having a metallic cage enclosing an electrical connector assembly wherein the electrical connector assembly includes an upper connector unit and a lower connector unit each having the corresponding contact module equipped with plural formed signal contacts and plural interstitial blanked grounding contact.

2. Description of Related Art

U.S. Pat. No. 10,461,475 discloses a QSFP-DD (Quad Small Form Factor Pluggable Double Density) dual port connector which is equipped with a plurality of transverse grounding bars to respectively mechanically and electrically connect to the corresponding grounding contacts for anti-EMI (Electromagnetic Interference). U.S. Provisional Application No. 63/053,611, filed Jul. 18, 2020, also discloses similar concept. Anyhow, to increase the EMI shielding effect, it is desired to provide a relatively large shielding plate between every adjacent to differential-pair signal contacts in the transverse direction. Anyhow, it is also preferred to have the signal contacts stamped and formed to be in an edge coupling manner for better SI (Signal Integrity) performance.

SUMMARY OF THE INVENTION

Therefore, the invention is to provide a hybrid contact arrangement in the connector wherein the signal contacts are stamped and formed while the grounding contacts are blanked and associated with the corresponding shielding plates to efficiently separate the neighboring differential-pair signal contacts. An electrical connector assembly includes an upper connector unit and a lower connector unit in a vertical direction. Each connector unit includes a contact module received within an insulative housing. The contact module includes an upper contact unit and a lower contacts unit stacked with each other. Each of the upper contact unit and the lower contact unit includes a front/outer contact part and a rear/inner contact part each including a plurality contacts essentially composed of a plurality of differential-pair signal contacts and a plurality of grounding contacts alternately arranged with each other in a the transverse direction wherein the differential-pair signal contacts are stamped and formed from sheet metal and successively integrally formed with a plurality of insulative transverse bars via insert-molding while the grounding contacts are directly blanked from sheet metal and associated with corresponding shielding plates assembled to the insulative transverse bar. Structurally, the grounding contacts of the front/outer contact part are unitarily paired with the corresponding grounding contacts of the rear/inner contact part, respectively, via the corresponding shielding plates. The housing forms opposite grooves to receive opposite ends of the insulative transverse bars so as to assemble the contact module within the housing.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
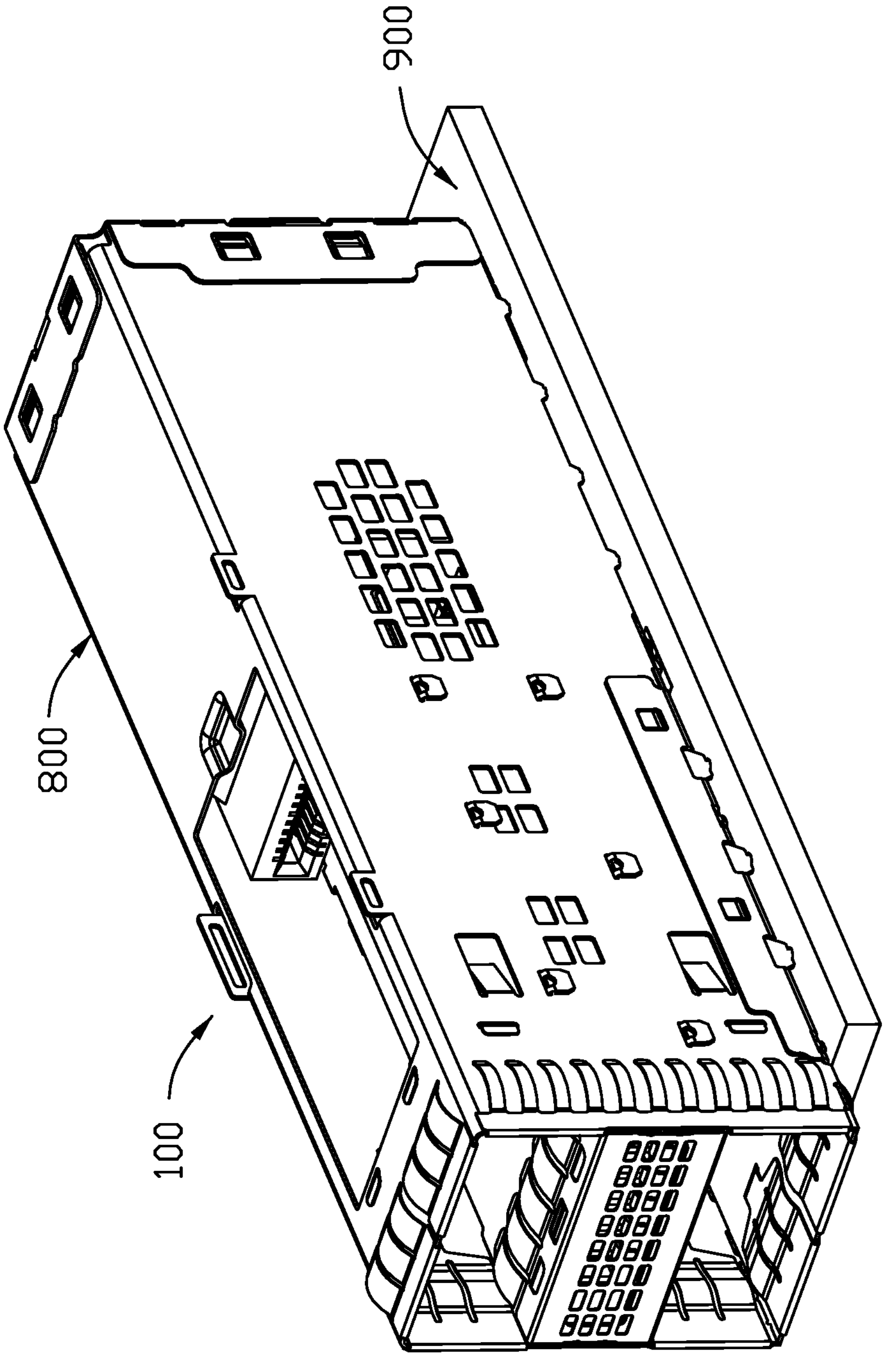
FIG. 1 is a perspective view of an electrical device mounted upon a printed circuit board.
Figure 2:
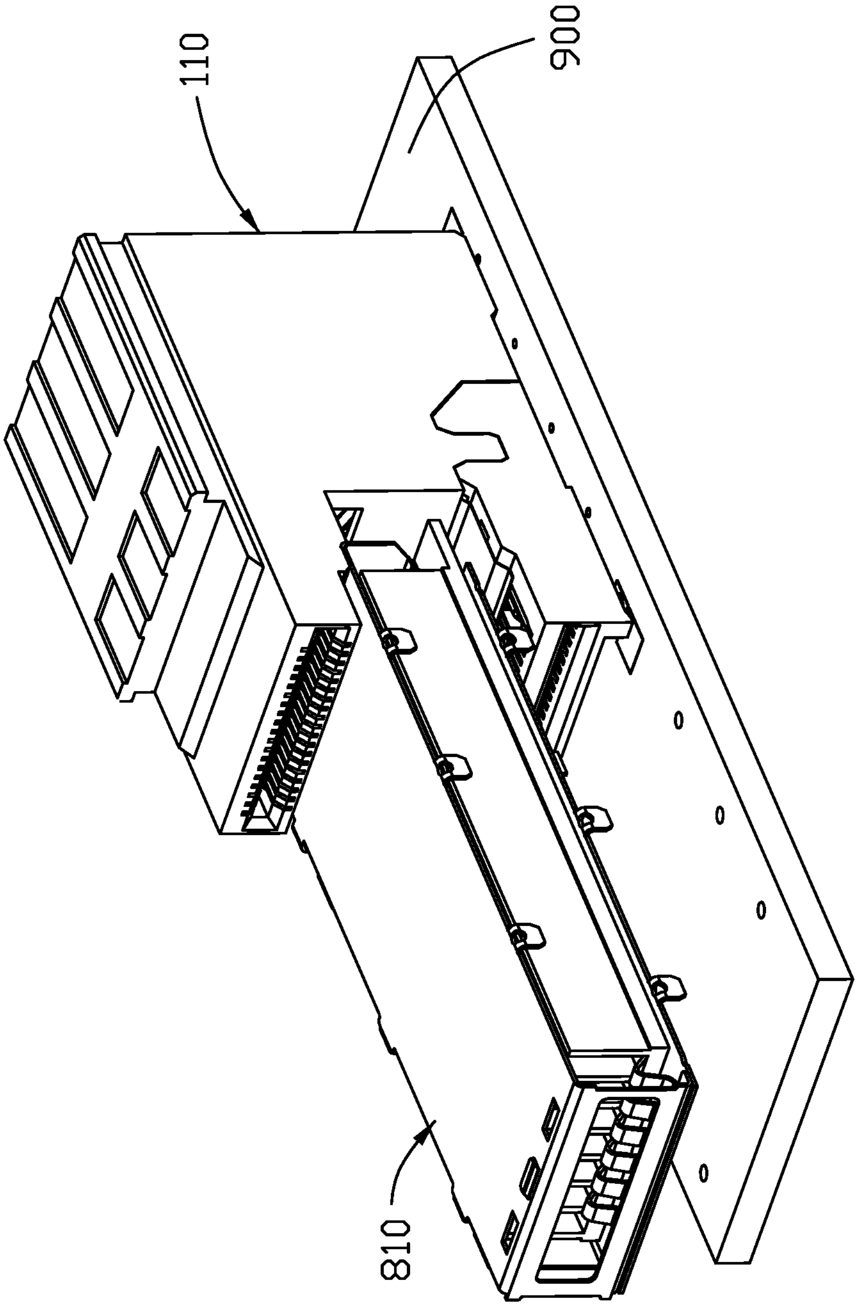
FIG. 2 is a perspective view of the electrical device mounted upon the printed circuit board of FIG. 1 without the metal cage.
Figure 3:
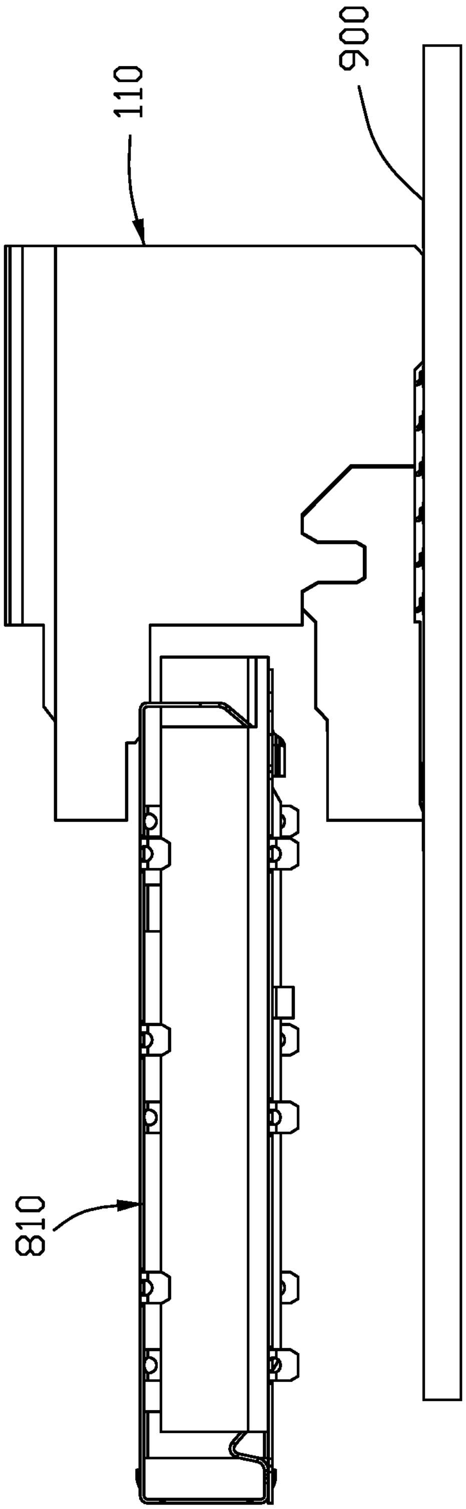
FIG. 3 is a side view of the electrical device mounted upon the printed circuit board of FIG. 2.
Figure 4:
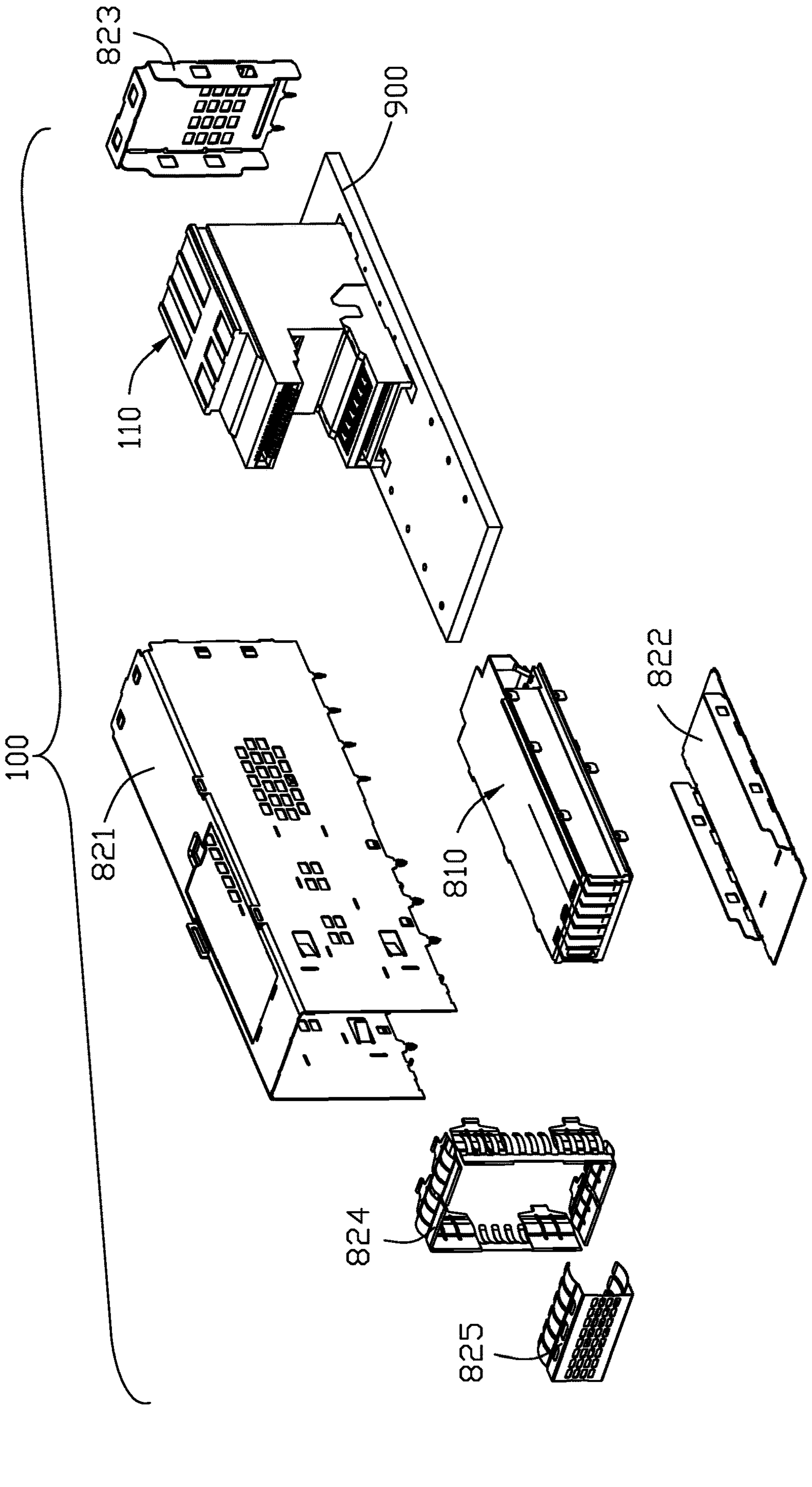
FIG. 4 is an exploded perspective view of the electrical device on the printed circuit board of FIG. 1.
Figure 5:
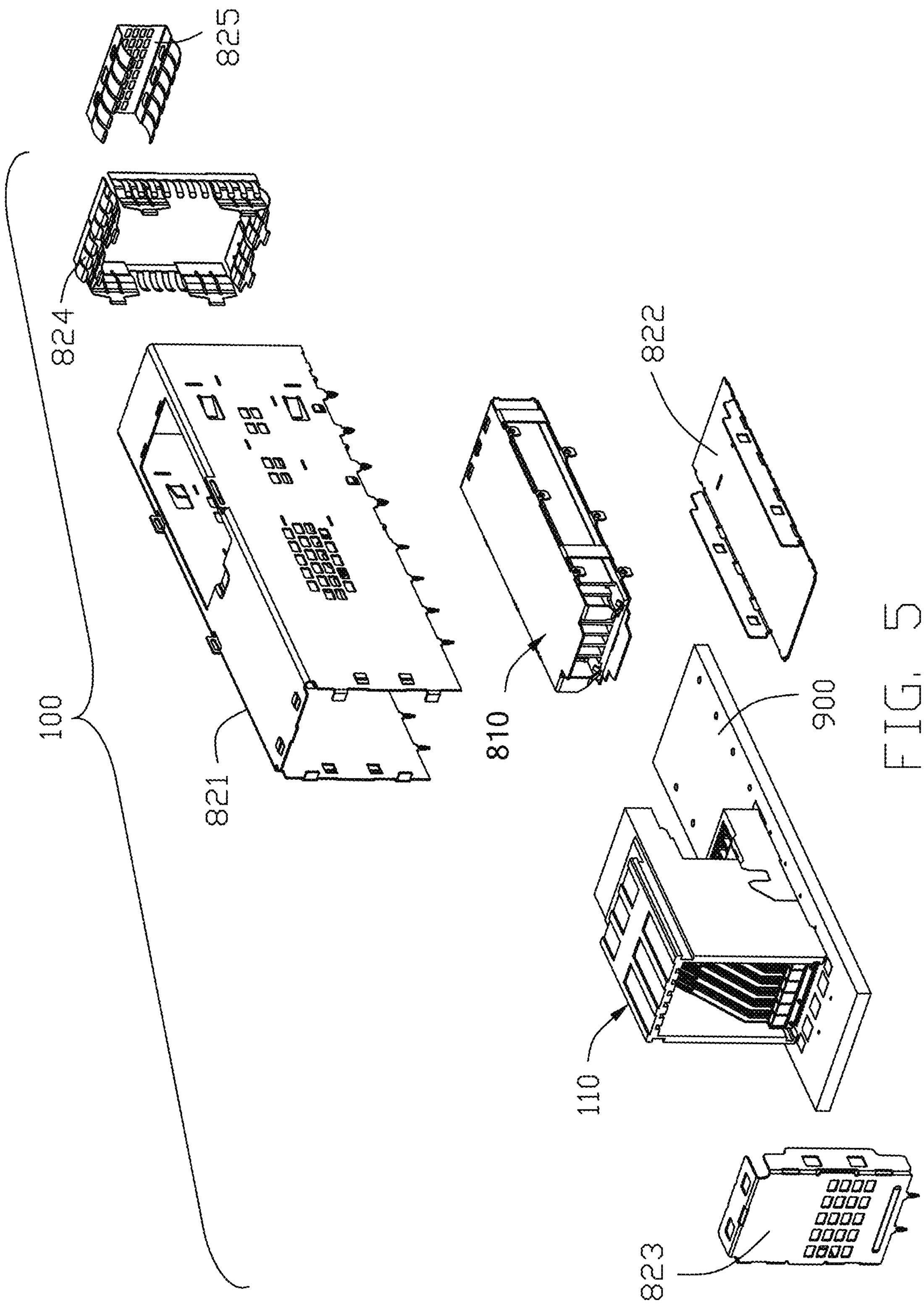
FIG. 5 is another exploded perspective view of the electrical device on the printed circuit board of FIG. 4.
Figure 6:
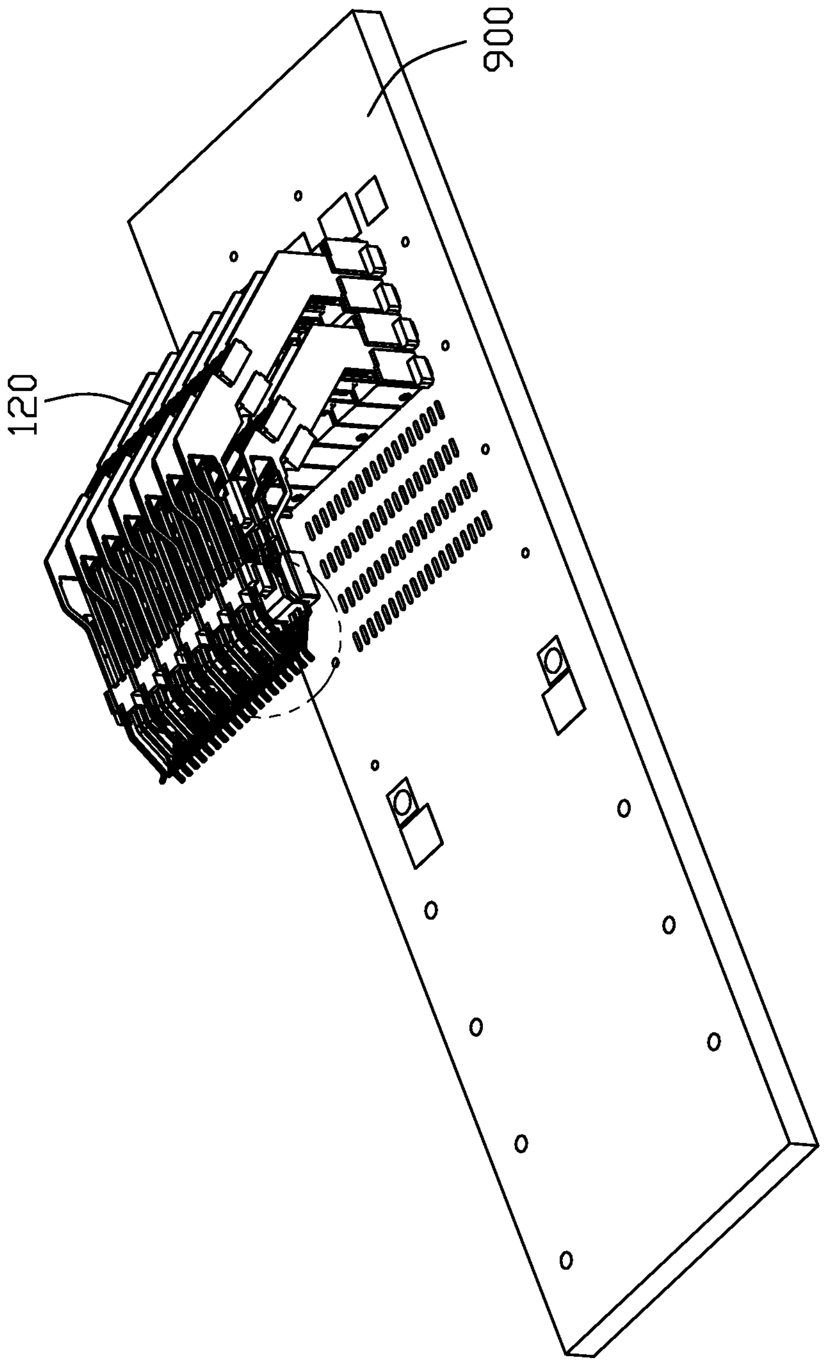
FIG. 6 is a perspective view of a contact module of the electrical connector assembly of the electrical device on the printed circuit board of FIG. 4.
Figure 7:
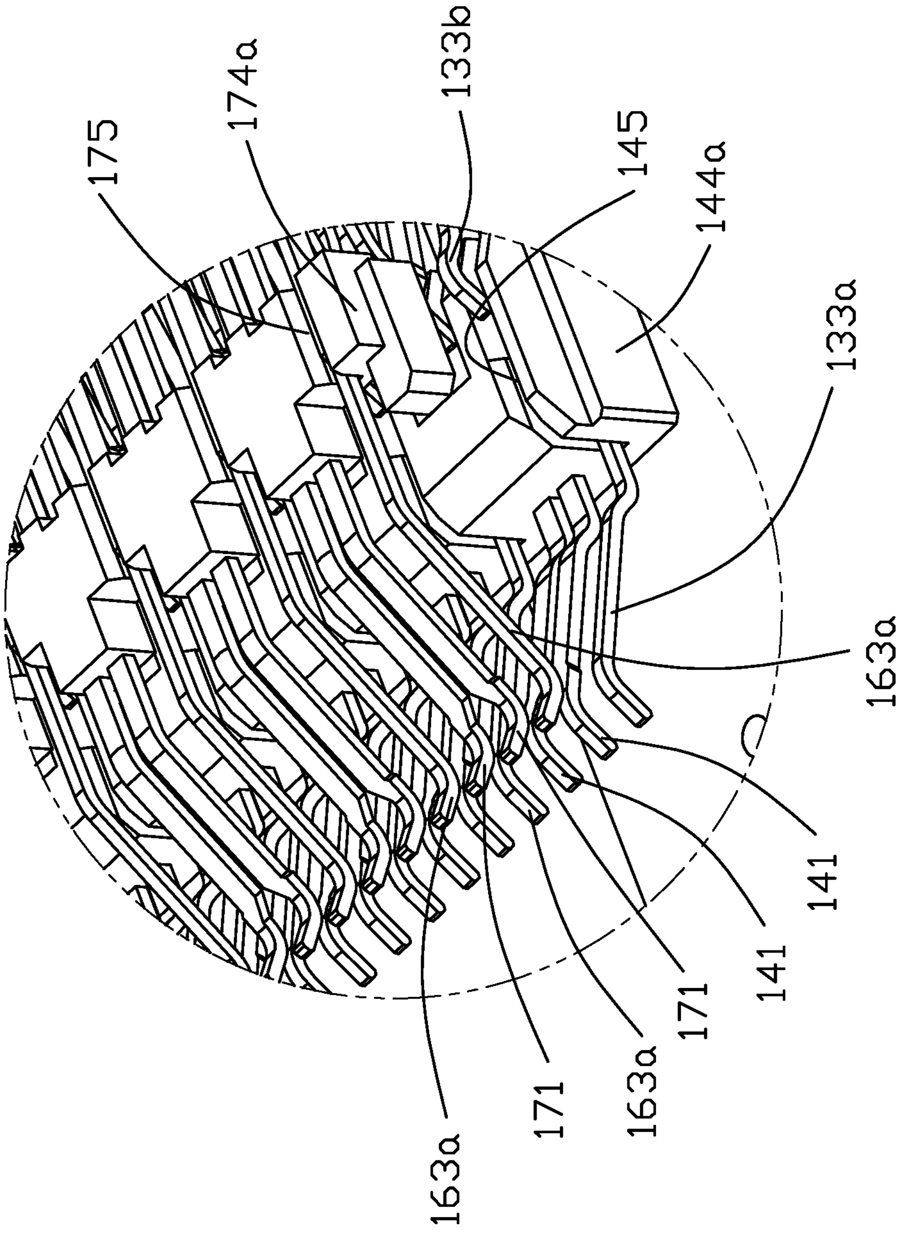
FIG. 7 is an enlarged perspective view of the contact module of the electrical connector assembly of the electrical device of FIG. 6.
Figure 8A:
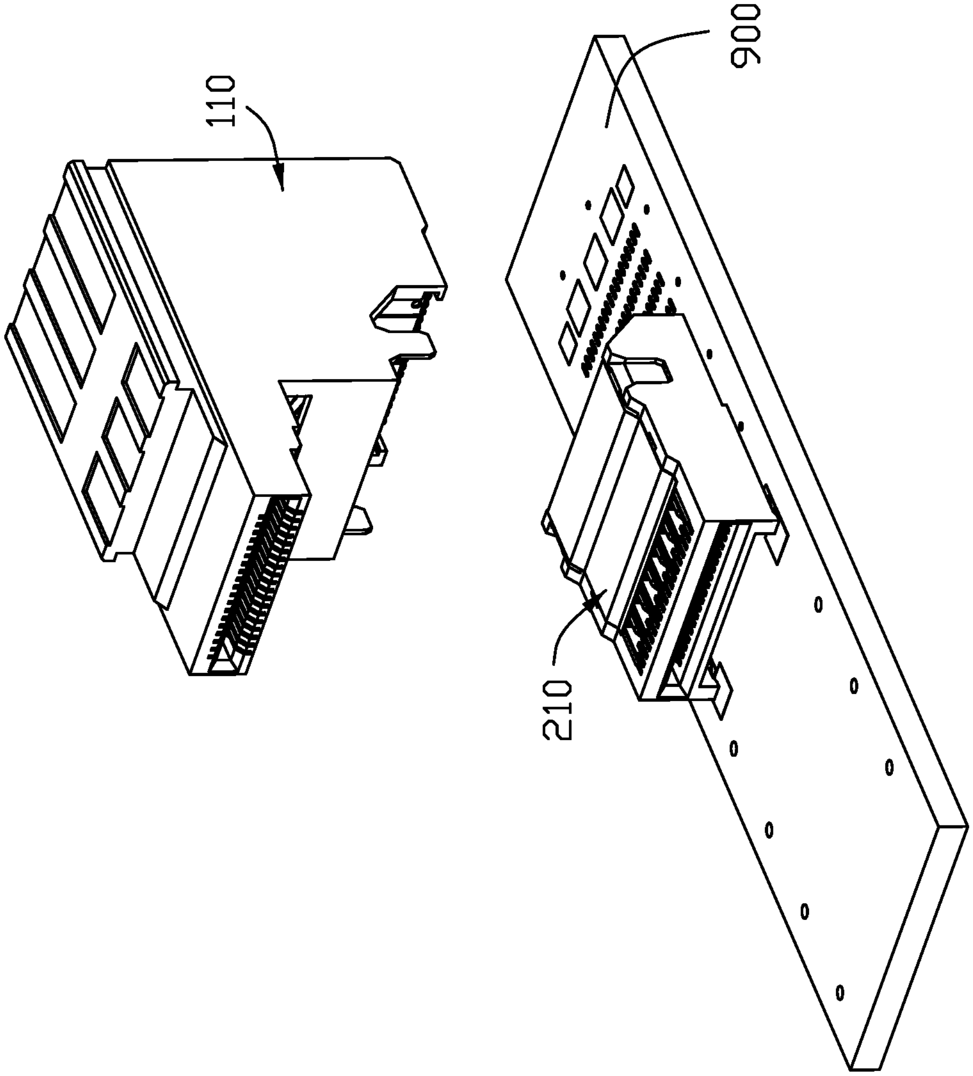
FIG. 8(A) is a perspective view of the electrical connector assembly of the electrical device upon the printed circuit board of FIG. 1 wherein the upper connector unit is removed away from the lower connector unit.
Figure 8B:
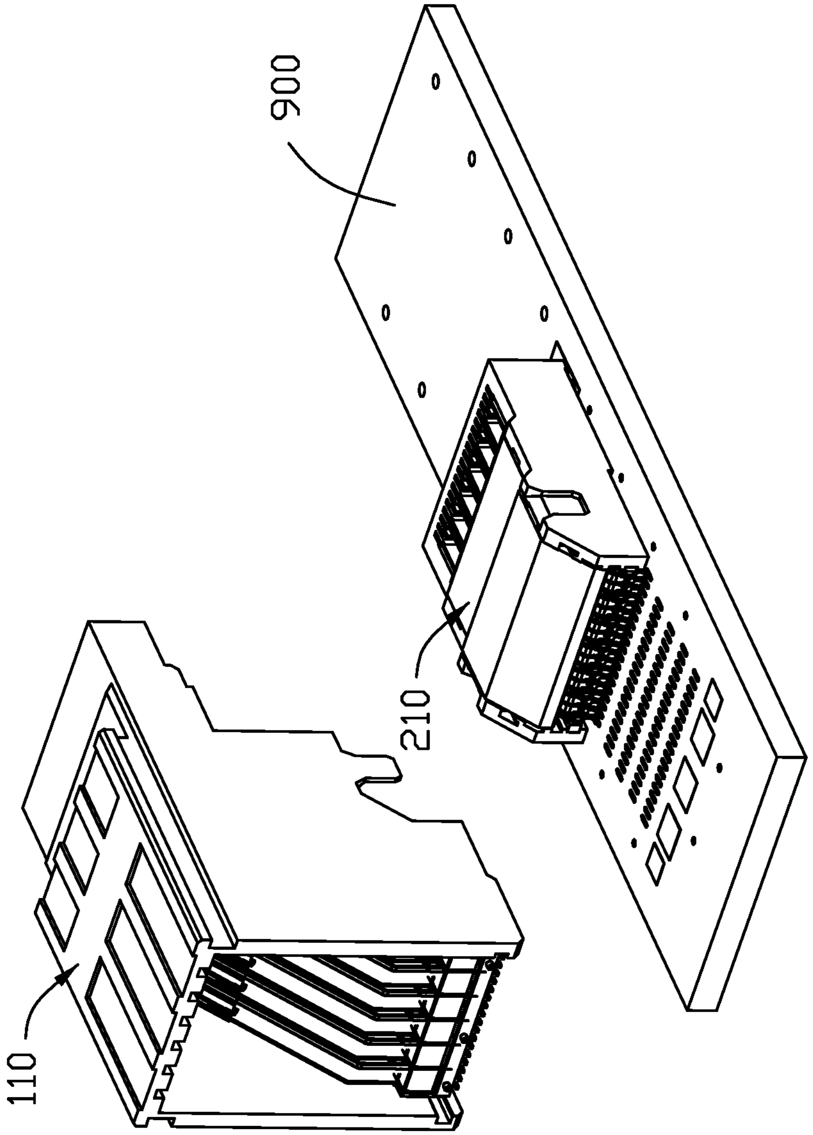
FIG. 8(B) is another perspective view of the electrical connector assembly of the electrical device upon the printed circuit board of FIG. 8(A)
Figure 9A:
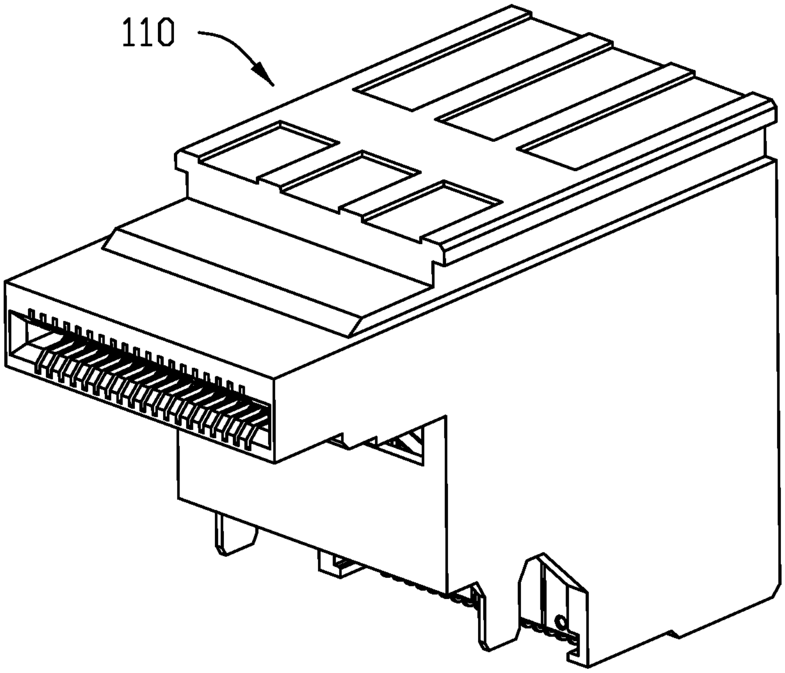
FIG. 9(A) is a perspective view of the upper connector unit of the electrical connector assembly of the electrical device of FIG. 8(A)
Figure 9B:
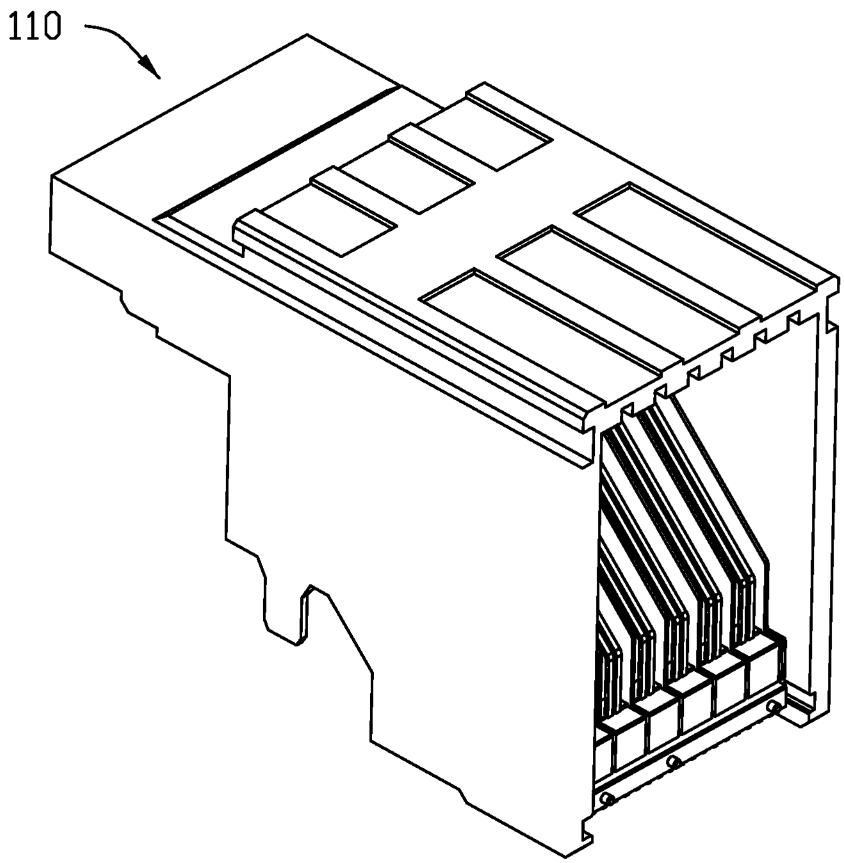
FIG. 9(B) is another perspective view of the upper connector unit of the electrical connector assembly of the electrical device of FIG. 9(A)
Figure 10A:
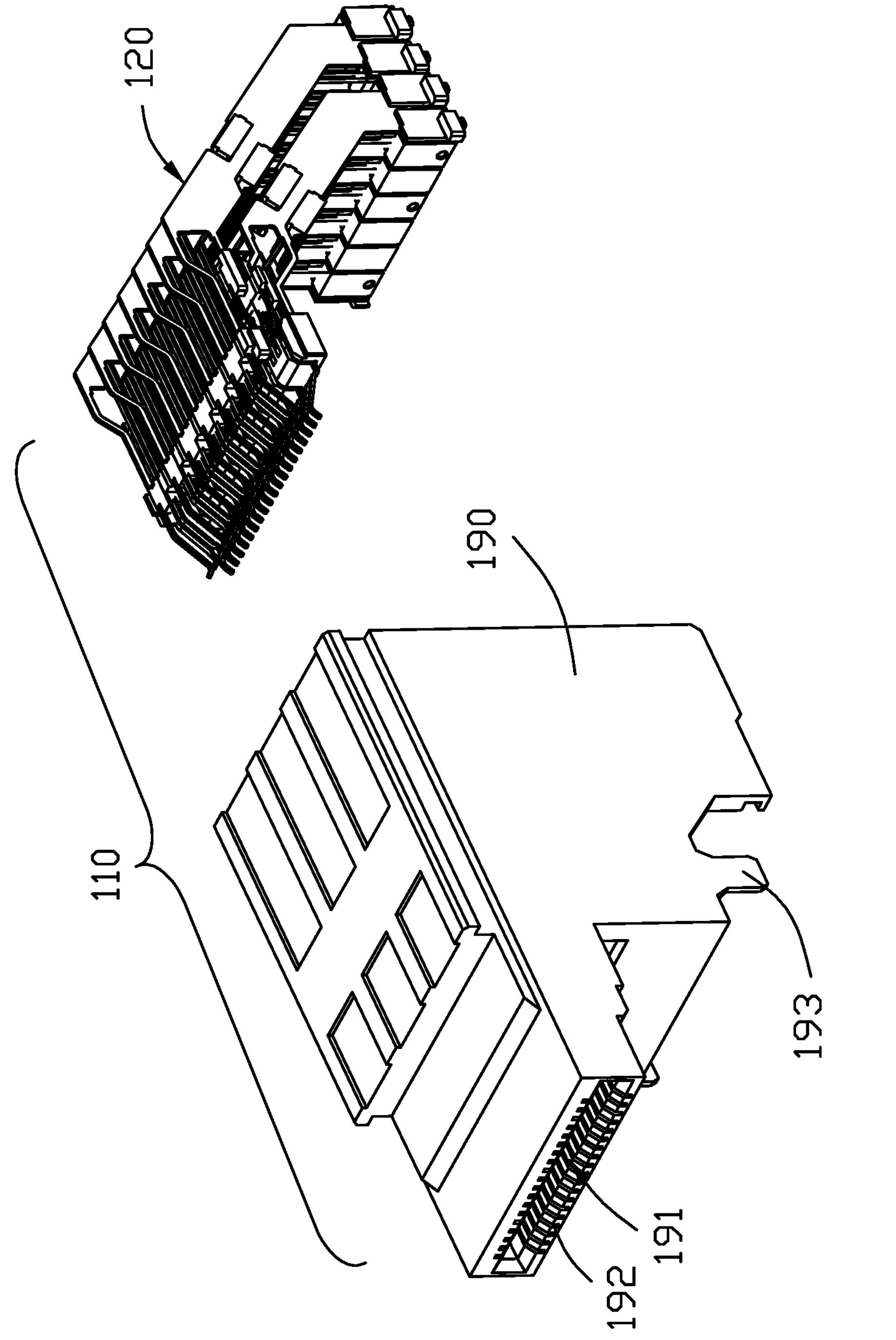
FIG. 10(A) is an exploded perspective view of the upper connector unit of the electrical connector assembly of the electrical device of FIG. 9(A)
Figure 10B:
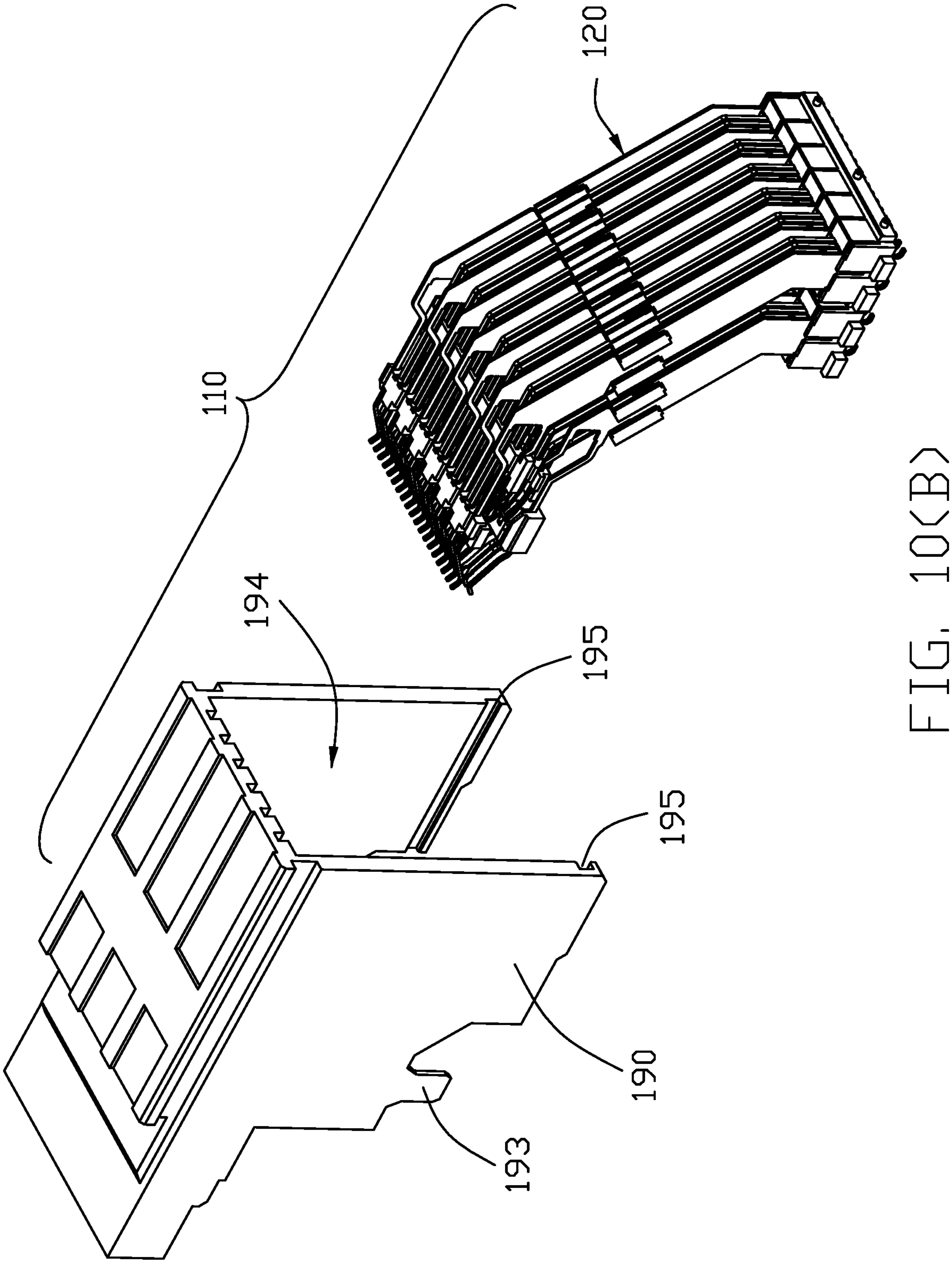
FIG. 10(B) is another perspective view of the upper connector unit of the electrical connector assembly of the electrical device of FIG. 10(A)
Figure 11A:
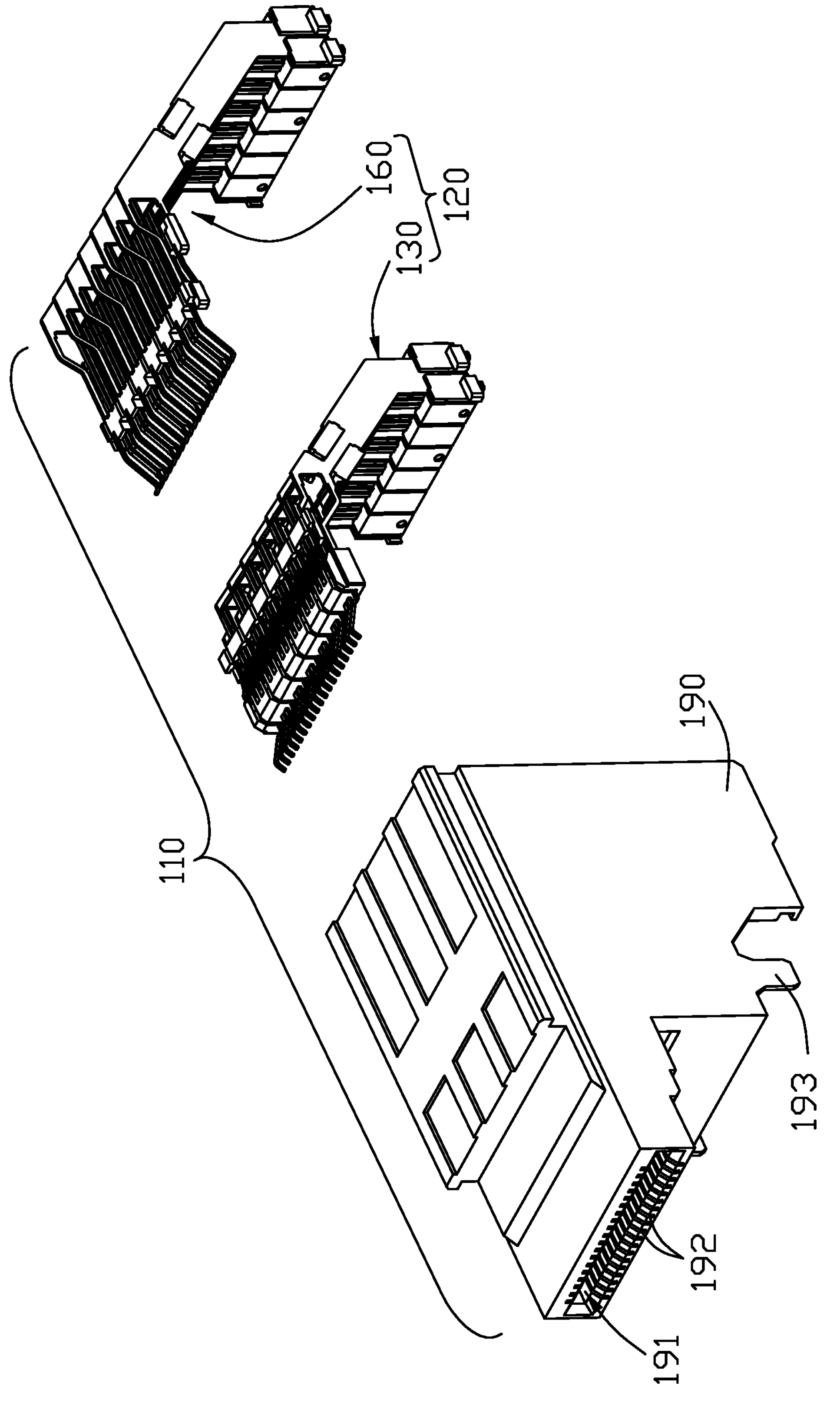
FIG. 11(A) is a further exploded perspective view of the upper connector unit of the electrical connector assembly of the electrical device of FIG. 10(A)
Figure 11B:
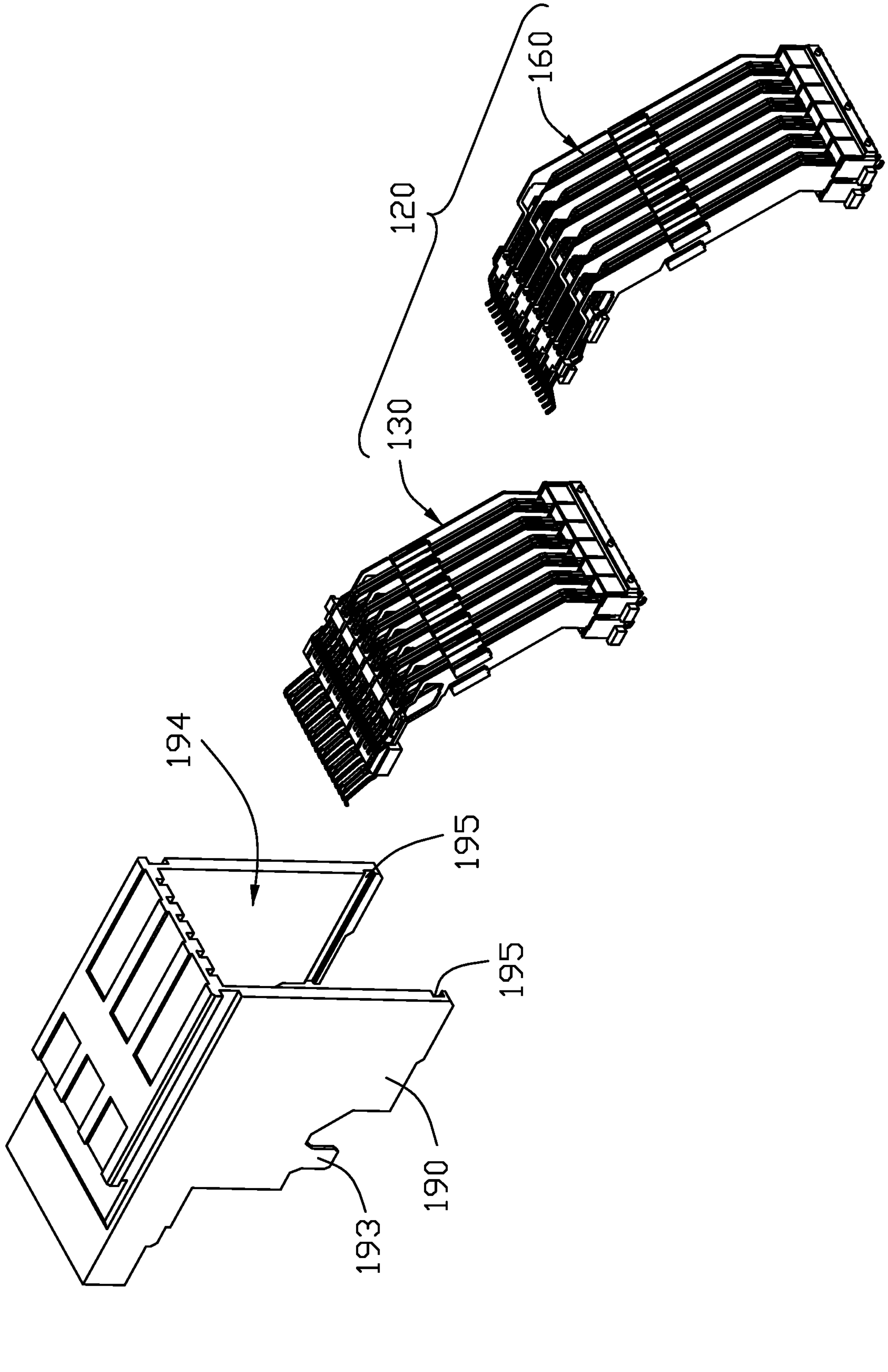
FIG. 11(B) is another exploded perspective view of the upper connector unit of the electrical connector assembly of the electrical device of FIG. 10(A)
Figure 12A:
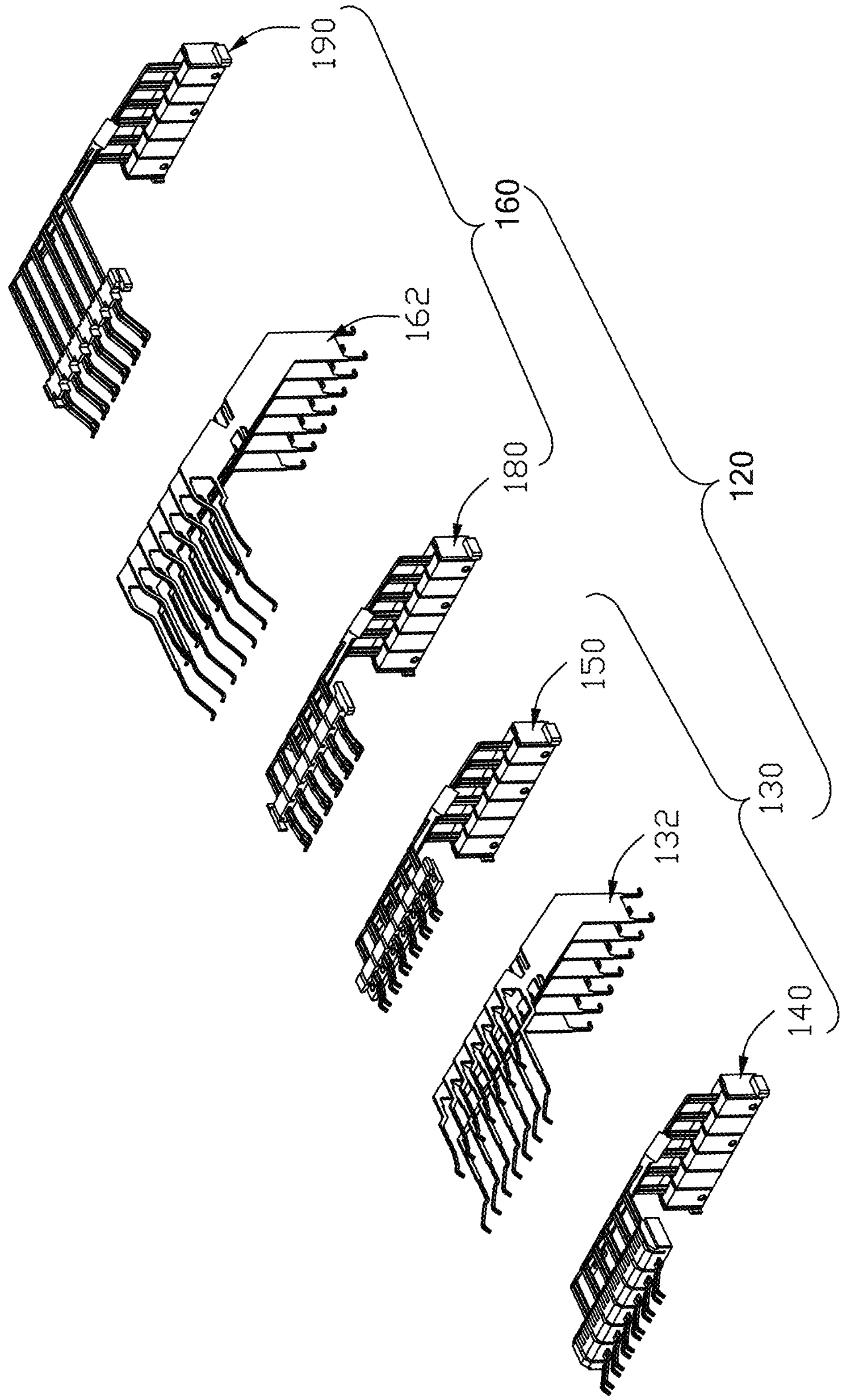
FIG. 12(A) is an exploded perspective view of the contact module of the upper connector unit of the electrical connector assembly of the electrical device of FIG. 11(A)
Figure 12B:
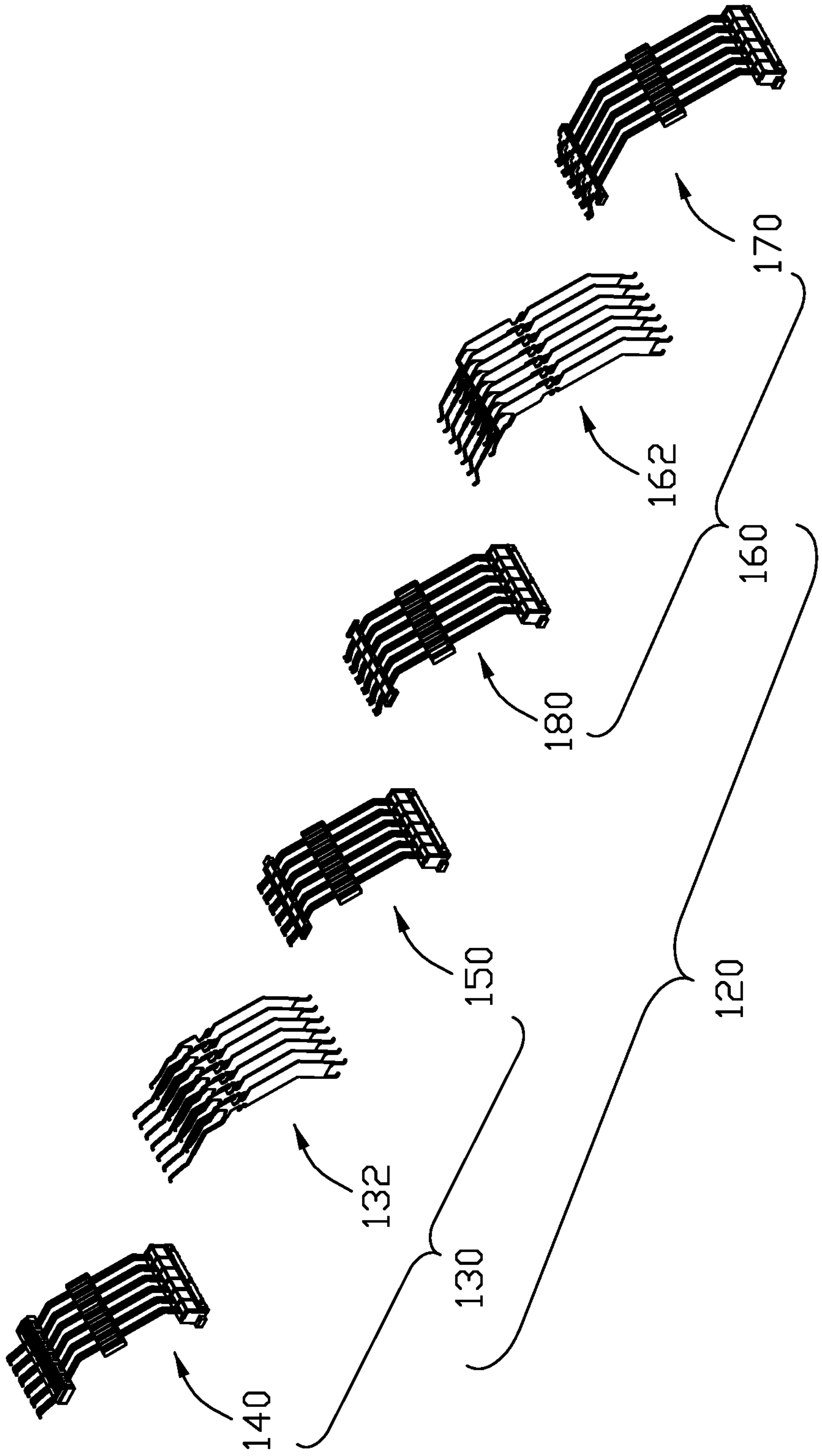
FIG. 12(B) is another perspective view of the contact module of the upper connector unit of the electrical connector assembly of the electrical device of FIG. 12(A)

Reference will now be made in detail to the embodiments of the present disclosure.

Referring to FIGS. 1-16(B), an electrical device 800 mounted upon a printed circuit board 900 to commonly form an electrical assembly 100. The electrical device 800 is essentially of a QSFP-DD interface, and includes an electrical connector assembly 110/210 surrounded by a metal cage which is composed of U-shaped main body 821, a bottom wall 822, a rear wall 823, and an outer grounding clip 824 located at a front end region of the main body 821 and equipped with a plurality of sprint tangs (not labeled) for contacting the external chase (not shown) which surrounds the metal cage, and the a pluggable QSFP-DD transceiver module (not shown) which is received within the metal cage and mechanically and electrically connects to the electrical assembly 100. A heat sink 810 is secured within the cage and essentially between the upper mating port 191 of the upper connector unit 110 and the lower mating port 221 of the lower connector unit 210. An inner grounding clip 825 surrounds a front end region of the heat sink 810 for mechanically and electrically connecting to the aforementioned pluggable QSFP-DD transceiver module.

The electrical connector assembly 110/210 includes a lower connector unit 210 and an upper connector unit 110 stacked upon the lower connector unit 110. The lower connector unit 210 includes an insulative lower housing forming a lower mating port 221, a plurality of passageways 222 by two sides of the lower mating port 221, a plurality of opposite grooves 223 in two opposite side walls, and a rear space 225. Each side wall forms an assembling recess 224. A (lower) contact module 237 is composed of an upper contact unit 235 and a lower contact unit 236 wherein the upper contact unit 235 is composed of a front/outer contact part 231 and a rear/inner contact part 232, and the lower contact unit 236 is composed of a front/outer contact part 234 and a rear/inner contact part 233. The contact module 237 is assembled into the receiving space 235 by having two opposite ends of the corresponding insulative transverse bar (not labeled) of each part received within the corresponding grooves 223 A cap 240 is retained between opposite horizontal channels (not labeled) in the opposite side walls and above the contact module 237. Understandably, the contacting sections of the contacts of the contact module 237 are receiving within the passageways 222 and exposed in the lower mating port 221 for mating with the corresponding/inserted pluggable transceiver module (not shown).

The upper connector unit 110 includes an (upper) contact module 120 received within an insulative upper housing 190. The upper housing 190 forms an upper mating port 191 for receiving a pluggable transceiver module (not shown), and a plurality of passageways 192 by two sides of the upper mating port 191, a pair of alignment posts 193 for receipt within the corresponding recesses 224 of the lower housing 220 of the lower connector unit 210, a pair of (inner) grooves 195 in the opposite side walls (not labeled), and a rear space 194 for receiving the contact module 120.

Figure 13A:
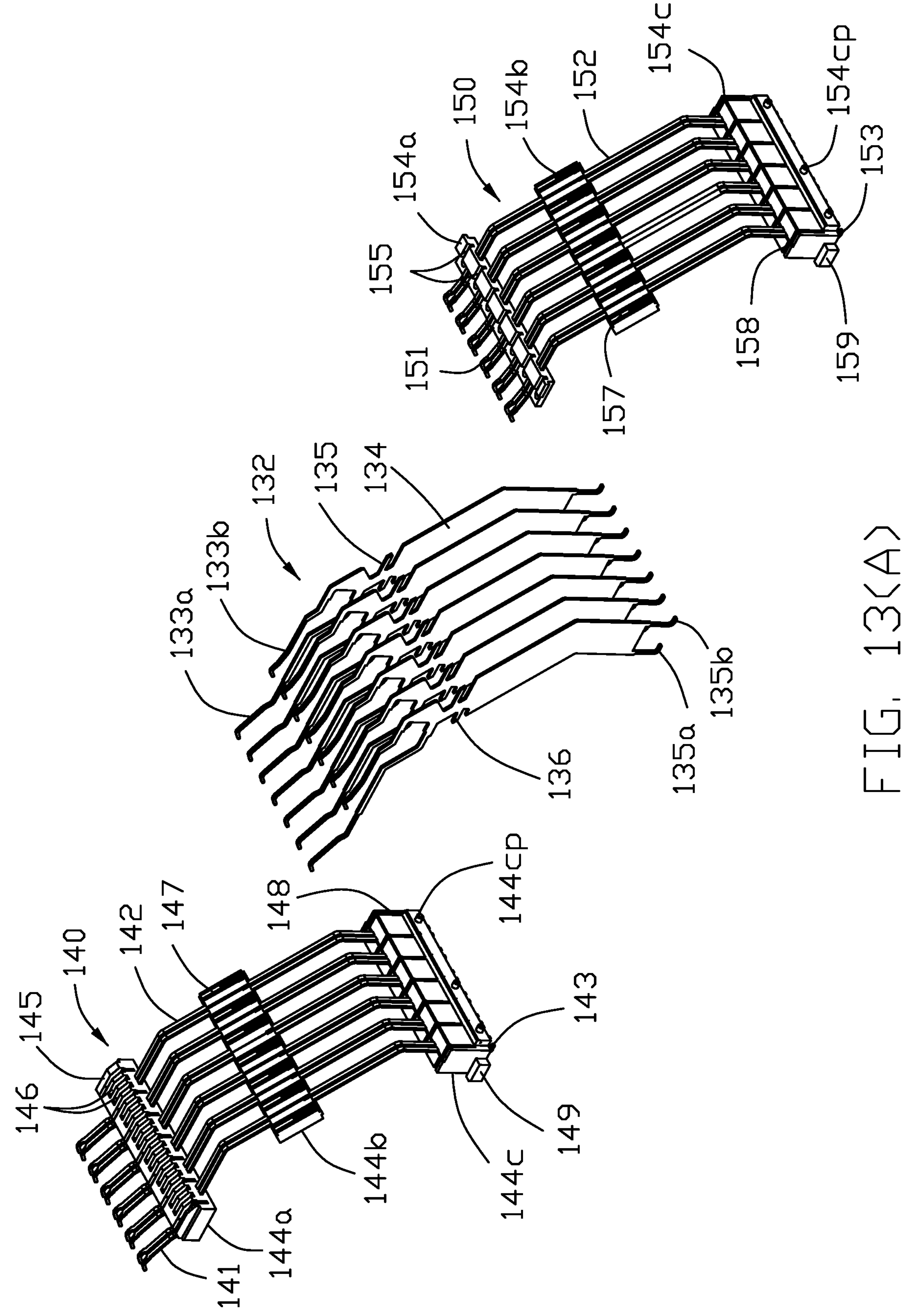
FIG. 13(A) is an enlarged exploded perspective view of the lower contact unit of the contact module of the upper connector unit of the electrical connector assembly of the electrical device of FIG. 12(A)

The contact module 120 is composed of a lower contact unit 130 and an upper contact unit 160 stacked upon the lower contact unit 130. As shown in FIG. 13(A), the lower contact unit 130 includes a front/outer contact part 140, a rea/inner contact part 150, and a shielding plate part 132 sandwiched therebetween. The front/outer contact part 140 includes plural pairs of differential-pair signal contacts 142 side by side arranged with one another along the transverse direction, and integrally formed, via insert-molding, with an insulative front transverse bar **144*a*, an insulative middle transverse bar 144*b* and an insulative transverse bar 144*c*. A plurality of slots 145 and a plurality of paired slots 146 are formed in the front transverse bar 144*a*, a plurality of slots 147 are formed in the middle transverse bar 144*b*, and a plurality slots 148 are formed in the rear transverse bar 144*c*. The rear transverse bar 144*c* further includes a plurality of protruding poles 144*cp* on a rear side, and a pair of guiding protrusions 149 on two opposite sides. The differential-pair signal contacts 142 have corresponding contacting sections 141 in front of the front transverse bar 144*a* for receipt within the corresponding passageways 192 to be exposed in the upper mating port 191 for mating with the pluggable transceiver module (not shown), and a plurality of solder tails 143 around the rear transverse bar 144*c* for mounting to the printed circuit board 900**.

Similarly, the rear/inner contact part 150 includes plural pairs of differential-pair signal contacts 152 side by side arranged with one another along the transverse direction, and integrally formed, via insert-molding, with an insulative front transverse bar **154*a*, an insulative transverse bar 154*b* and an insulative rear transverse bar 154*c*. A plurality of slots 155 are formed in the front transverse bar 154*a*, a plurality of slots 157 are formed in the middle transverse bar 154*b*, and a plurality of slots 158 are formed in the rear transverse bar 154*c*. The rear transverse bar 154*c* further includes a pair of guiding protrusions 159 on two opposite sides, and a plurality of protruding poles 154*cp* on the rear side. The differential-pair signal contacts 152 have contacting sections 151 in front of the front transverse bar 154*a* for receipt within the corresponding passageways 192 to be exposed into the upper mating port 191 for mating with the pluggable transceiver module (not shown), and solder tails 153 around the rear transverse bar 154*c* for mounting to the printed circuit board 900**.

The shielding plate part 132 includes a plurality of metallic shielding plates 134 arranged with and spaced from one another along the transverse direction. Each is unitarily formed with a front/outer grounding contact **133*a* and a rear/inner grounding contact 133*b*, a forward lance 136 and a rearward lance 135, and a front solder tail 135*a* and a rear solder tail 135*b*. In other words, each shielding plate 134** functions as two grounding contacts unified together.

When assembled, the front lances 136 are inserted into the corresponding slots 147 of the front/outer contact part 140, and the rear lances 135 are inserted into the corresponding slots 157 of the rear/inner contact part 150 as so to have the whole lower contact unit 130 is secured. The front solder tails 135*a* are received within the corresponding slots 148, and the rear solder tails 135*b* are received within the corresponding slots 158. Specifically, the front transverse bar 154*a* of the rear/inner contact part 150 is essentially located between the front/outer grounding contacts 133*a* and the rear/inner grounding contacts 133*b*. The front/outer grounding contacts 133*a* extend through the corresponding slots 145 of the front/outer contact part 140, the rear/inner grounding contacts 1336 extend through the corresponding slot 155 of the rear/inner contact part 150 and are movable within the corresponding slots 145 of the front/outer contact part 140 upon downward deflection by the inserted pluggable transceiver module (not shown). Similarly, the contacting sections 151 of the rear/inner contact part 150 are moveable within the corresponding slots 146 of the front/outer contact part 140 upon downward deflection by the inserted pluggable transceiver module (not shown). The protruding poles 144*cp* of the front/outer contact part 140 are received within the corresponding holes (not shown) in the rear transverse bar 154*c* of the rear/inner contact part 150 so as to have the rear transverse bar 144*c* of the front/outer contact part 140 and the rear transverse bar 154*c* of the rear/inner contact part 150 are intimately assembled with each other. The guiding protrusions 149 of the front/outer contact part 140 and the guiding protrusions 159 of the rear/inner contact part 150 are commonly received within the corresponding grooves 195 of the upper housing 190. Understandably, the housing 190 also includes corresponding grooves (not shown) to receive the opposite ends of the front transverse bar 144*a*. Notably, in the transverse direction the front/outer grounding contacts 133*a* are aligned with the contacting sections 141 of the front/outer contact part 140, and rear/inner grounding contacts 133*b* are aligned with the contacting sections 151 of the rear/inner contact part 150. As well, the solder tails 135*a* are aligned with the solder tails 143, and the solder tails 135*b* are aligned with the solder tails 153 in the transverse direction. Understandably, compared with the traditional respective grounding contacts, the shielding plates 134 provides enlarged shielding area in the transverse direction so as to enhance of the shielding effect between the neighboring differential-pair signal contacts 142/152.

Figure 13B:
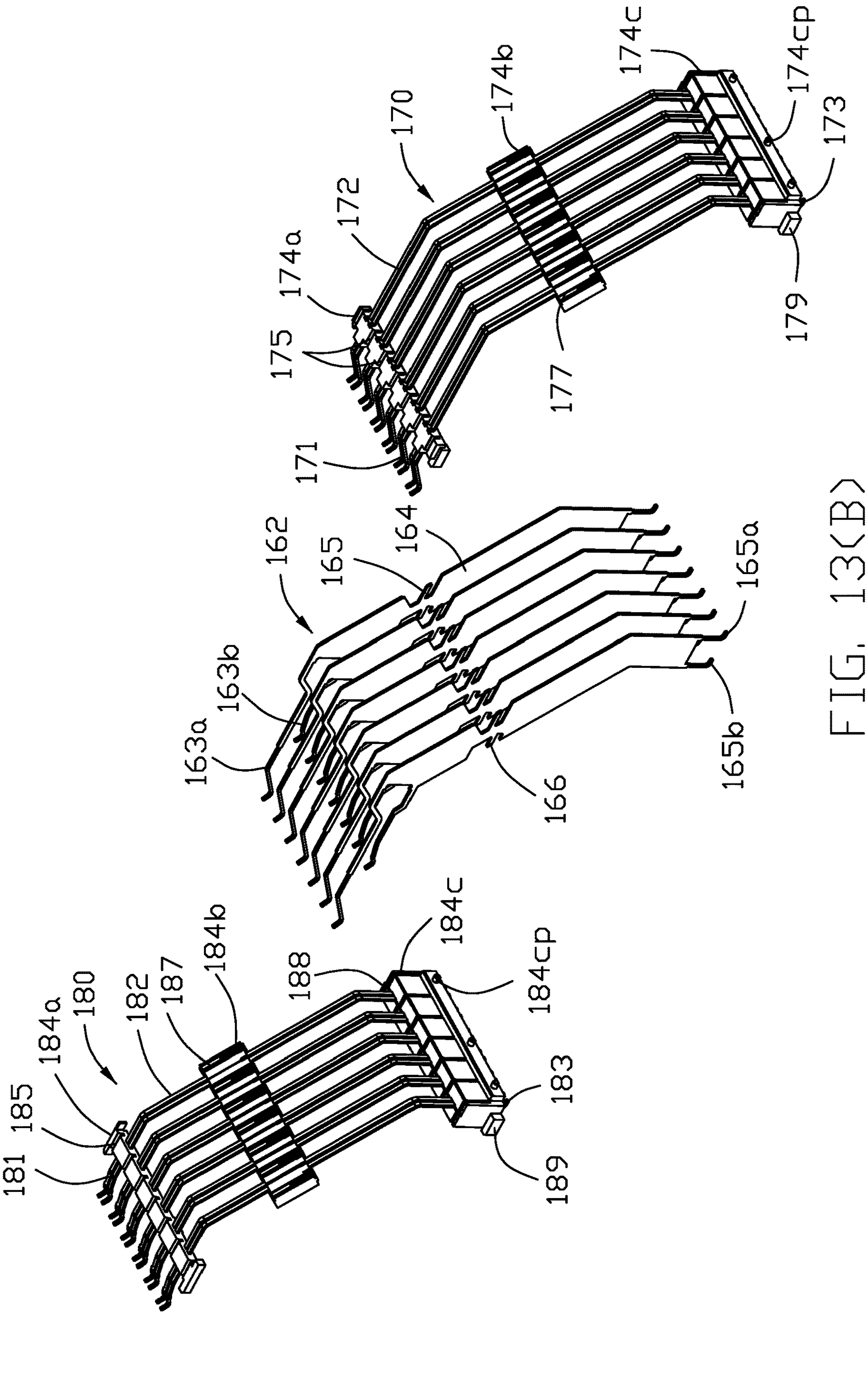
FIG. 13(B) is an enlarged exploded perspective view of the upper contact unit of the contact module of the upper connector unit of the electrical connector assembly of the electrical device of FIG. 12(B)
Figure 14:
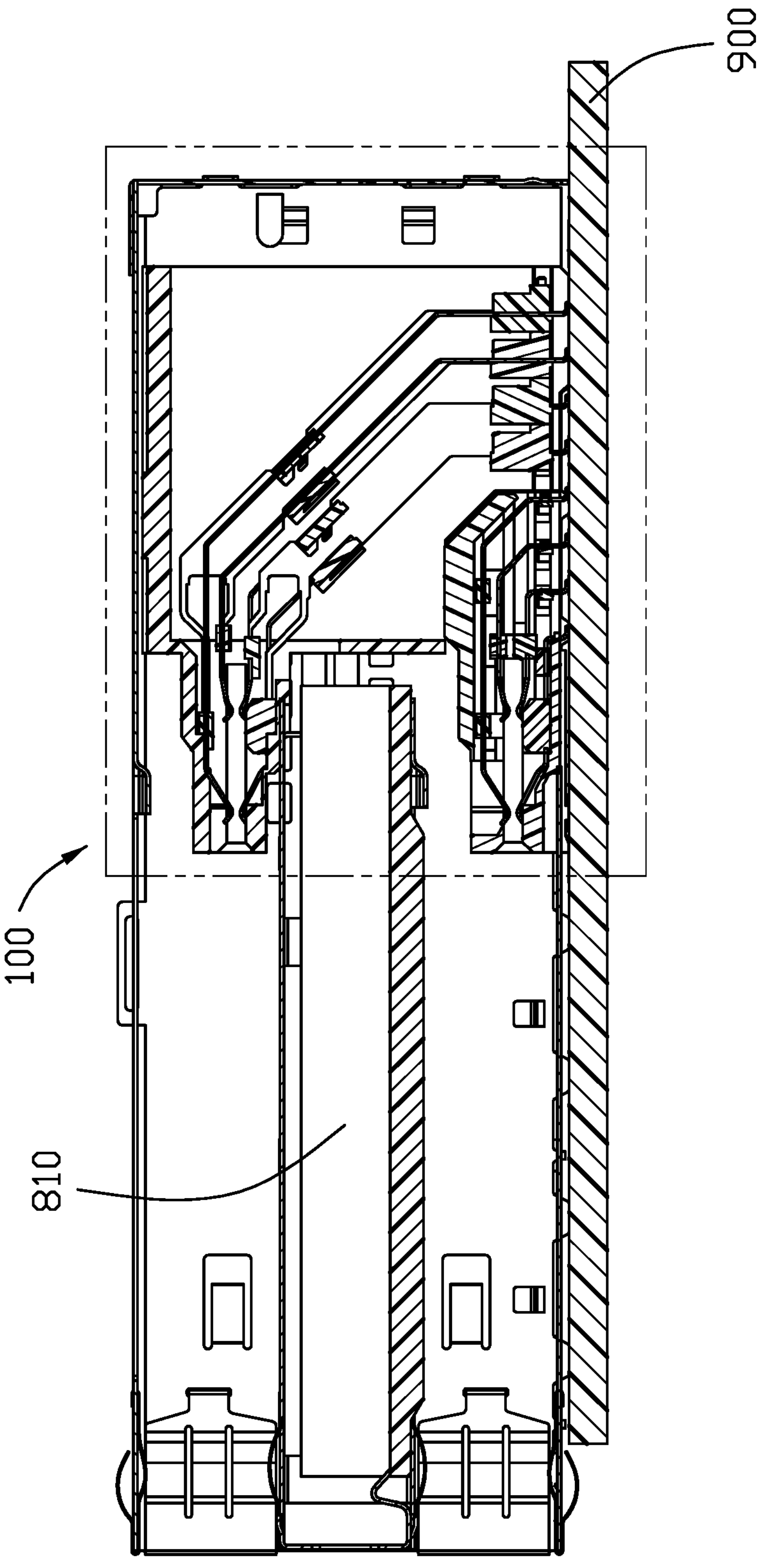
FIG. 14 is a cross-sectional view of electrical device mounted upon the printed circuit board of FIG. 1.
Figure 14A:
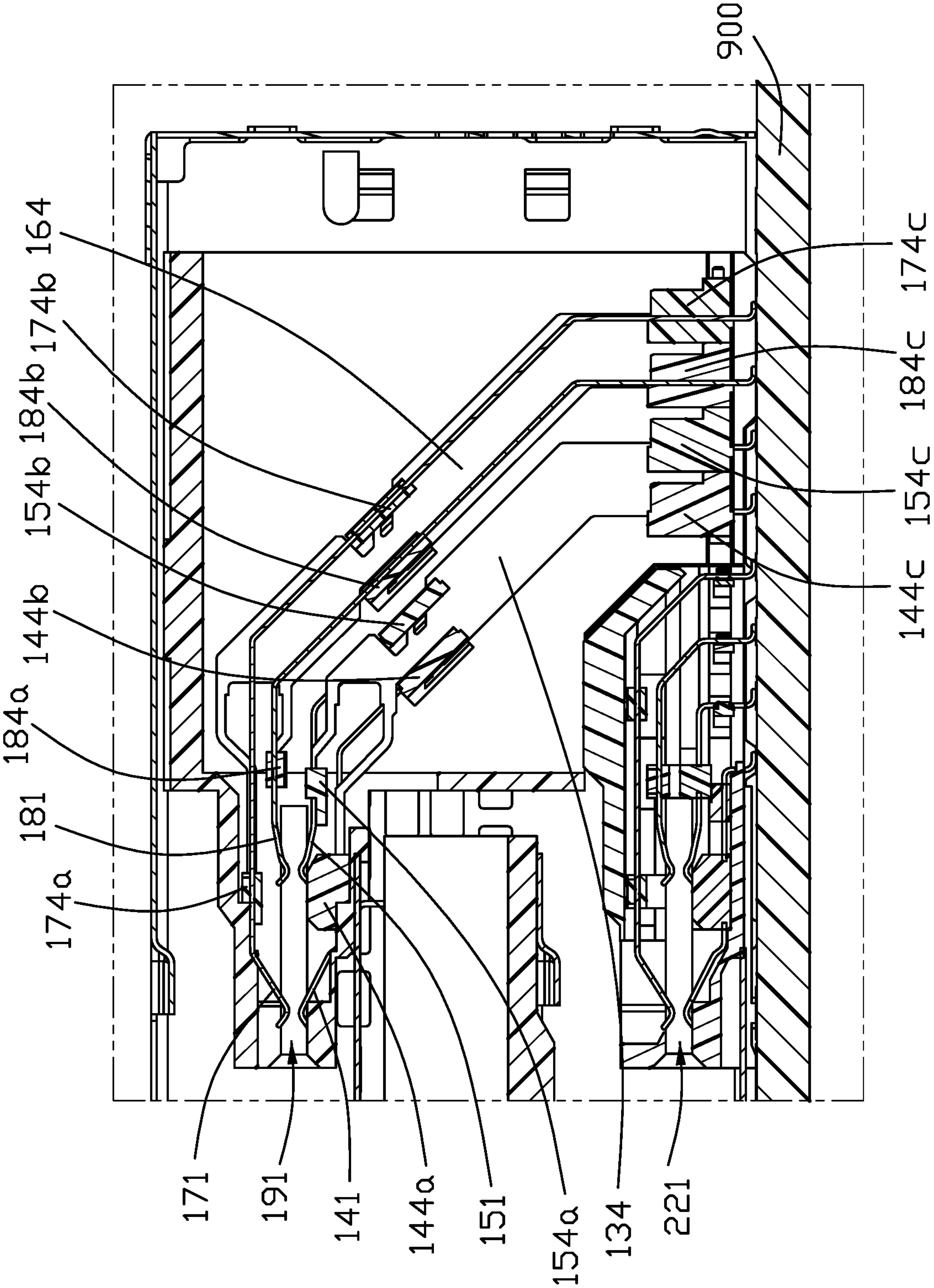
FIG. 14(A) is an enlarged cross-sectional view of electrical device mounted upon the printed circuit board of FIG. 14(A)
Figure 15A:
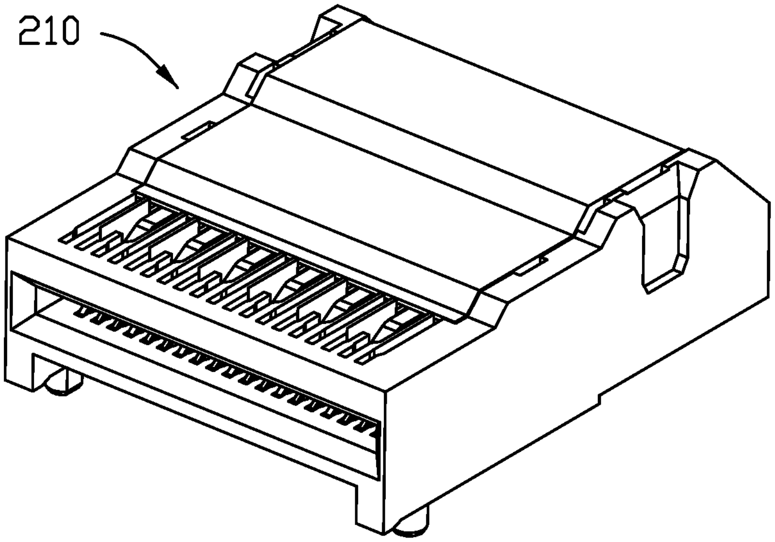
FIG. 15(A) is a perspective view of the lower connector unit of the electrical connector assembly of electrical device of FIG. 8(A)
Figure 15B:
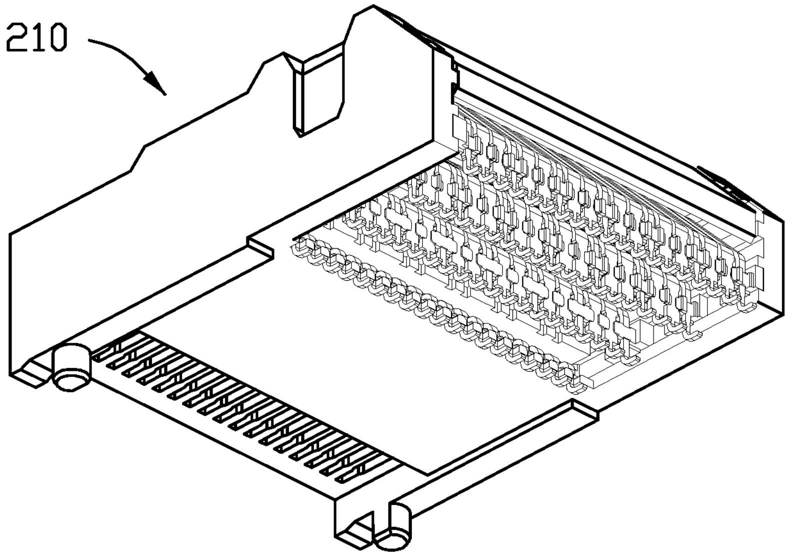
FIG. 15(B) is another perspective view of the lower connector unit of the electrical connector assembly of electrical device of FIG. 15(A)
Figure 16A:
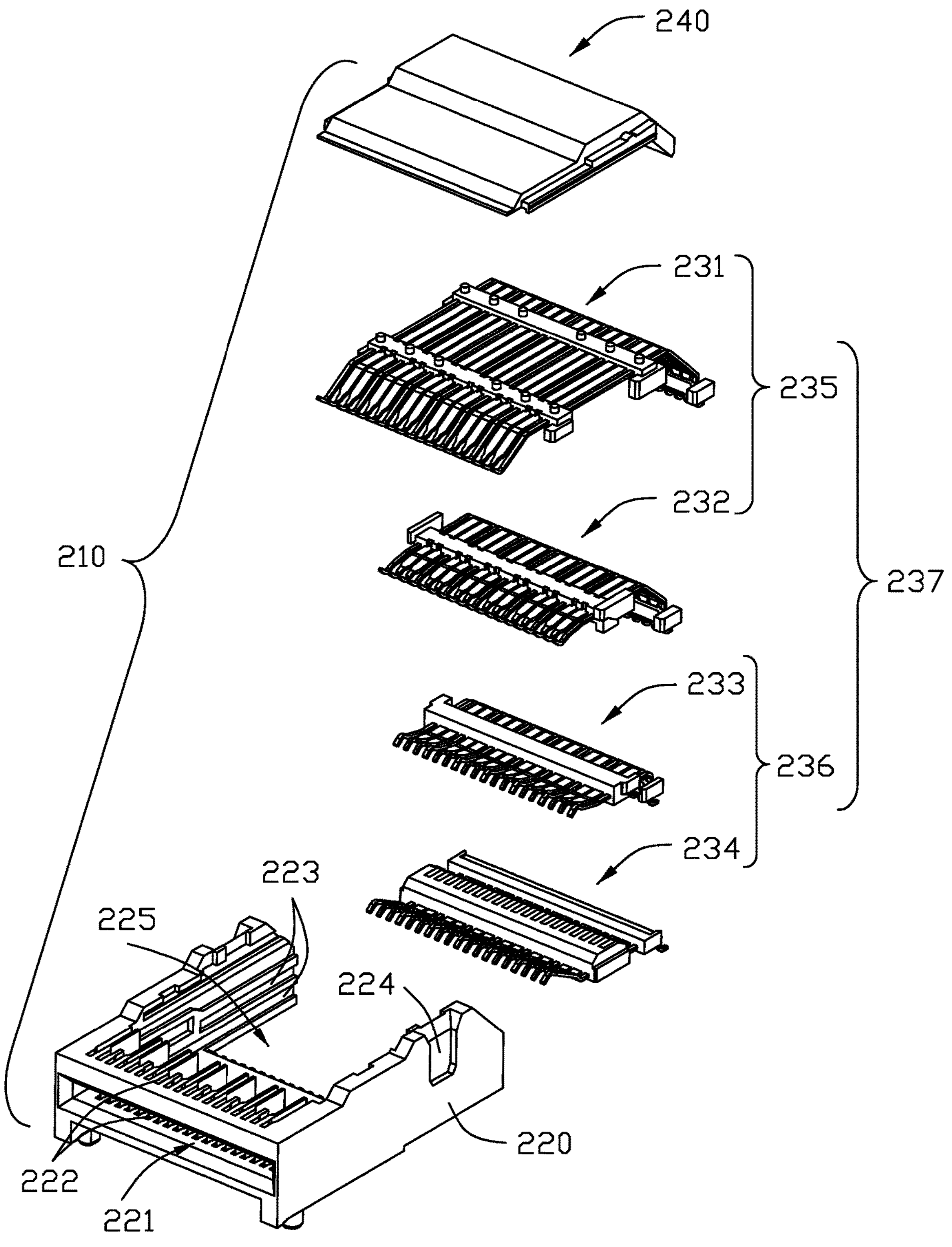
FIG. 16(A) is an exploded perspective view of the lower connector unit of the electrical connector assembly of electrical device of FIG. 15(A)
Figure 16B:
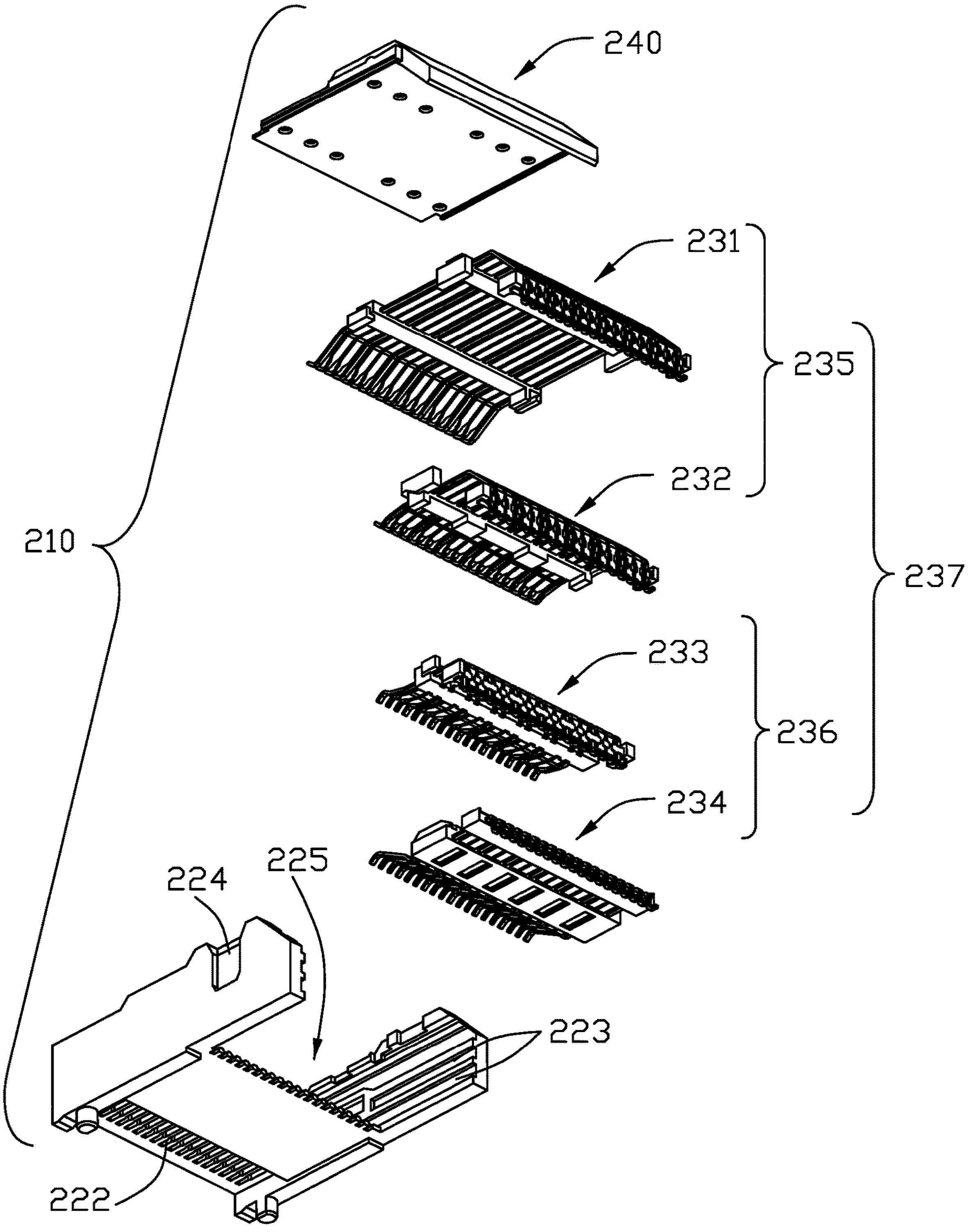
FIG. 16(B) is another perspective view of the lower connector unit of the electrical connector assembly of electrical device of FIG. 16(A).

Similar to the arrangement of the lower contact unit 130 disclosed in FIG. 13(A), the upper contact unit 160 as shown in FIG. 13(B) includes a front/outer contact part 170, a rear/inner contact part 180, and a shielding plate part 162 sandwiched therebetween. The front/outer contact part 170 includes plural pairs of differential-pair signal contacts 172 integrally formed with the front transverse bar 174*a*, the middle transverse bar 174*b*, and a rear transverse bar 174*c*. The slots 175, 177 and 178 are respectively formed in the front transverse bar 174*a*, the middle transverse bar 174*b* and the rear transverse bar 174*c*. The rear transverse bar 174*c* further includes the protruding poles 174*cp* and the guiding protrusions 179. The differential-pair signal contacts 172 have corresponding contacting sections 171 and solder tails 173. The rear/inner contact part 180 includes plural pairs of differential-pair signal contacts 182 integrally formed with the front transverse bar 184*a*, the middle transverse bar 184*b* and the rear transverse bar 184*c*. The slots 185, 187 and 188 are formed in the front transverse bar 184*a*, the middle transverse bar 184*b* and the rear transverse bar 184*c*, respectively. The rear transverse bar 184*c* further includes protruding poles 184*cp* and guiding protrusions 189. The differential-pair signal contacts 182 have corresponding contacting sections 181 and solder tails 183. The shielding plate part 162 includes a plurality of shielding plates 164. Each shielding plat plate 164 includes a front/outer grounding contact 163*a* and a rear/inner grounding contact 163*b* around a front area, a pair of lances 165 and 166 around the middle area, and a pair of solder tails 165*a* and 165*b* around the rear area. Notably, because the arrangement of the upper contact unit 160 is similar to that of the lower contact unit 130, no detailed description is required. In addition, the protruding poles 154*cp* are received within the corresponding holes (not shown) in the transverse bar 184*c* as shown in FIG. 14(A).

In brief, the invention is to provide the hybrid type contact arrangement in the connector wherein the front grounding contact is unitarily, in a blanked manner, formed with the rear grounding contact via an enlarged shielding plate so as to provide better shielding effect between the neighboring differential-pair signal contacts in the transverse direction while still allowing the differential-pair signal contacts to be formed in a relatively deformable manner compared with the blanked manner, advantageously. Although the present invention has been described with reference to particular embodiments, it is not to be construed as being limited thereto. Various alterations and modifications can be made to the embodiments without in any way departing from the scope or spirit of the present invention as defined in the appended claims.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A connector unit comprising:

an insulative housing defining a front mating port for receiving a mating plug along a front to rear direction; and a contact module being received in the insulative housing and comprising:

a front/outer contact part comprising a pair of first differential signal contacts and a first transverse bar fixed with the pair of first differential signal contacts, each of the first differential signal contacts comprising a first signal contacting section, a first signal solder tail for being mounted to an outer printed circuit board, and a first signal body portion connected therebetween;

a rear/inner contact part comprising a pair of second differential signal contacts and a second transverse bar fixed with the pair of second differential signal contacts, each of the second differential signal contacts comprising a second signal contacting section, a second signal solder tail for being mounted to the outer printed circuit board, and a second signal body portion connected therebetween; and a shielding plate part fixed with the first transverse bar and comprising a first grounding contact disposed adjacent to and aligned with the pair of first signal contacting sections, a first grounding solder tail disposed adjacent to and aligned with the pair of first signal solder tails, and a grounding body portion extending therebetween; wherein the second signal contacting sections and the first signal contacting sections are disposed at a same side of the front mating port, the second signal contacting sections are disposed at a rear side of the first signal contacting sections, and the second signal solder tails are disposed at a rear side of the first signal solder tails;

the shielding plate part is fixed with the second transverse bar, the shielding plate part comprising a second grounding contact disposed adjacent to and aligned with the pair of second signal contacting sections and a second grounding solder tail disposed adjacent to and aligned with the pair of second signal solder tails; and the shielding plate part comprises a first lance extending forwardly to fix with the first transverse bar and a second lance extending rearwardly to fix with the second transverse bar.

2. The connector unit as claimed in claim 1, wherein the second grounding contact has a width measured along the front to rear direction that is equal to or larger than a width measured from a front side of the first pair of differential signal contacts to a rear side of the second pair of differential signal contacts along the front to rear direction.

3. The connector unit as claimed in claim 1, wherein the first grounding contact, the second grounding contact, the grounding body portion, the first grounding solder tail and the second grounding solder tail are disposed at a same plane.

4. The connector unit as claimed in claim 1, wherein the front/outer contact part comprises a first front transverse bar defining a plurality of slots for receiving the second signal contacting sections and the second grounding contact, respectively.

5. The connector unit as claimed in claim 1, wherein the front/outer contact part comprises a first rear transverse bar, and the rear/inner contact part comprises a second rear transverse bar mated with the first rear transverse bar.

6. The connector unit as claimed in claim 5, wherein the first rear transverse bar defines a slot receiving a front portion of the grounding body portion, and the second rear transverse bar defines a slot receiving a rear portion of the grounding body portion.

7. The connector unit as claimed in claim 1, wherein the contact module comprises:

a front/outer contact part comprising a pair of third differential signal contacts and a third transverse bar fixed with the third pair of differential signal contacts, both of the third differential signal contacts comprising a third signal contacting section opposite to the first signal contacting section, a third signal solder tail disposed at a rear side of the second signal solder tail for being mounted to the outer printed circuit board, and a third signal body portion connected therebetween;

a rear/inner contact part comprising a pair of fourth differential signal contacts and a fourth transverse bar fixed with the fourth pair of differential signal contacts, each of the fourth differential signal contacts comprising a fourth signal contacting section opposite to the second signal contacting section, a fourth signal solder tail disposed between the second signal solder tail and the third signal solder tail for being mounted to the outer printed circuit board, and a fourth signal body portion connected therebetween; and another shielding plate part fixed with the third transverse bar and comprising a third grounding contact disposed adjacent to and aligned with the pair of the third signal contacting sections, a fourth grounding contact disposed adjacent to and aligned with the pair of the fourth signal contacting sections, a third grounding solder tail disposed adjacent to and aligned with the pair of the third signal contacting sections, a fourth grounding solder tail disposed adjacent to and aligned with the pair of the fourth signal contacting sections, and a grounding body portion extending therebetween.

8. The connector unit as claimed in claim 7, wherein the third grounding contact has a width measured along the front to rear direction that is equal to or larger than a width measured from a front side of the fourth pair of differential signal contacts to a rear side of the third pair of differential signal contacts along the front to rear direction.

9. A connector unit comprising:

an insulative housing;

a first contact module received in the insulative housing and comprising:

a front/outer contact part comprising a plurality of first differential-pair signal contacts and a first transverse bar molded with the first differential-pair signal contacts, each of the first differential-pair signal contacts comprising a first signal contacting section;

a rear/inner contact part comprising a plurality of second differential-pair signal contacts and a second transverse bar molded with the second differential-pair signal contacts, each of the second differential-pair signal contacts comprising a second signal contacting section; and a first shielding plate part connected with the first transverse bar and the second transverse bar, the first shielding plate part comprising a first grounding contact disposed between two adjacent first differential-pair signal contacts and aligned with the first signal contacting section and a second grounding contact disposed between two adjacent second differential-pair signal contacts and aligned with the second signal contacting section; and a second contact module received in the insulative housing and comprising:

a front/outer contact part comprising a plurality of third differential-pair signal contacts and a third transverse bar molded with the third differential-pair signal contacts, each of the third differential-pair signal contacts comprising a third signal contacting section opposite to the first signal contacting section;

a rear/inner contact part comprising a plurality of fourth differential-pair signal contacts and a fourth transverse bar molded with the fourth differential-pair signal contacts, each of the fourth differential-pair signal contacts comprising a fourth signal contacting section opposite to the second signal contacting section; and a second shielding plate part connected with the third transverse bar and the fourth transverse bar, the second shielding plate part comprising a third grounding contact disposed between two adjacent third differential-pair signal contacts and aligned with the third signal contacting section and a fourth grounding contact disposed between two adjacent fourth differential-pair signal contacts and aligned with the fourth signal contacting section.

10. The connector unit as claimed in claim 9, wherein each first differential-pair signal contact comprises a first signal solder tail, and a first signal body portion connected between the first signal solder tail and the first signal contacting section, each second differential-pair signal contact comprising a second signal solder tail disposed at a rear of the first signal solder tail, and a second signal body portion connected between the second signal solder tail and the second signal contacting section, each third differential-pair signal contact comprising a third signal solder tail disposed at a rear of the second signal solder tail, and a third signal body portion connected between the third signal solder tail and the third signal contacting section, each fourth differential-pair signal contact comprising a fourth signal solder tail disposed between the second signal solder tail and the third signal solder tail, and a fourth signal body portion connected between the fourth signal solder tail and the fourth signal contacting section.

11. The connector unit as claimed in claim 10, wherein the first shielding plate part comprises a first grounding solder tail aligned with the first signal solder tails, a second grounding solder tail aligned with the second signal solder tails, and a first grounding body portion connected between the first grounding contact, the second grounding contact, and the first grounding solder tail, the second grounding solder tail, the second shielding plate part comprises a third grounding solder tail aligned with the third signal solder tails, a fourth grounding solder tail aligned with the fourth signal solder tails, and a second grounding body portion connected between the third grounding contact, the fourth grounding contact, the third grounding solder tail, and the fourth grounding solder tail.

12. The connector unit as claimed in claim 9, wherein the first grounding contact and the second grounding contact are in same vertical plane and spaced apart from each other along a front to rear direction; and the third grounding contact and the fourth grounding contact are in another same vertical plane and spaced apart from each other along the front to rear direction.

13. The connector unit as claimed in claim 9, wherein the front/outer contact part comprises a first rear transverse bar, the rear/inner contact part comprising a second rear transverse bar mated with the first rear transverse bar, the rear/inner contact part comprising a fourth rear transverse bar mated with the second rear transverse bar, the front/outer contact part of the second contact module comprising a third rear transverse bar mated with the fourth rear transverse bar.

14. The connector unit as claimed in claim 9, wherein the insulative housing defines a mating port for receiving a plug and a receiving space below the mating slot for receiving a lower connector unit defining a mating port for receiving another plug.

15. A connector unit comprising:

an insulative housing defining a front mating port for receiving a mating plug along a front to rear direction; and a contact module being received in the insulative housing and comprising:

a first front/outer contact part comprising a pair of first differential signal contacts and a first transverse bar fixed with the first pair of differential signal contacts, each of the first differential signal contacts comprising a first signal contacting section, a first signal solder tail for being mounted to an outer printed circuit board, and a first signal body portion connected therebetween;

a second rear/inner contact part comprising a pair of second differential signal contacts and a second transverse bar fixed with the pair of second differential signal contacts, each of the second differential signal contacts comprising a second signal contacting section, a second signal solder tail for being mounted to the outer printed circuit board, and a second signal body portion connected therebetween;

a first shielding plate part fixed with the first transverse bar and comprising a first grounding contact disposed adjacent to and aligned with the pair of first signal contacting sections, a first grounding solder tail disposed adjacent to and aligned with the pair of first signal contacting sections, and a grounding body portion extending therebetween;

a third front/outer contact part comprising a pair of third differential signal contacts and a third transverse bar fixed with the third pair of differential signal contacts, both of the third differential signal contacts comprising a third signal contacting section opposite to the first signal contacting section, a third signal solder tail disposed at rear side of the second signal solder tail for being mounted to the outer printed circuit board, and a third signal body portion connected therebetween;

a fourth rear/inner contact part comprising a pair of fourth differential signal contacts and a fourth transverse bar fixed with the fourth pair of differential signal contacts, each of the fourth differential signal contacts comprising a fourth signal contacting section opposite to the second signal contacting section, a fourth signal solder tail disposed between the second signal solder tail and the third signal solder tail for being mounted to the outer printed circuit board, and a fourth signal body portion connected therebetween; and a second shielding plate part fixed with the third transverse bar and comprising a third grounding contact disposed adjacent to and aligned with the pair of the third signal contacting sections, a fourth grounding contact disposed adjacent to and aligned with the pair of the fourth signal contacting sections, a third grounding solder tail disposed adjacent to and aligned with the pair of the third signal contacting sections, a fourth grounding solder tail disposed adjacent to and aligned with the pair of the fourth signal contacting sections, and a grounding body portion extending therebetween; wherein the second signal contacting sections and the first signal contacting sections are disposed at a same side of the front mating port, the second signal contacting sections are disposed at a rear side of the first signal contacting sections, and the second signal solder tails are disposed at a rear side of the first signal solder tails.

* * * * *